(12) United States Patent
Hori et al.

(10) Patent No.: US 7,351,755 B2
(45) Date of Patent: Apr. 1, 2008

(54) METHOD OF PRODUCING OIL-IN-WATER TYPE EMULSION CONTAINING INTERNALLY CROSSLINKED FINE RESIN PARTICLE, OIL-IN-WATER TYPE EMULSION CONTAINING INTERNALLY CROSSLINKED FINE RESIN PARTICLE, CATION ELECTRODEPOSITION COATING COMPOSITION AND SUBSTANCE COATED

(75) Inventors: Hitoshi Hori, Osaka (JP); Yasuhiro Hayashi, Osaka (JP); Tsuyoshi Inoue, deceased, late of Hyogo (JP); by Seiko Inoue, legal representative, Hyogo (JP); Hisaichi Muramoto, Hyogo (JP)

(73) Assignee: Nippon Paint Co., Ltd., Osaka (JP)

( * ) Notice: Subject to any disclaimer, the term of this patent is extended or adjusted under 35 U.S.C. 154(b) by 547 days.

(21) Appl. No.: 10/809,222

(22) Filed: Mar. 25, 2004

(65) Prior Publication Data
US 2004/0214923 A1 Oct. 28, 2004

(30) Foreign Application Priority Data
Mar. 25, 2003 (JP) .............................. 2003-083552
Mar. 25, 2003 (JP) .............................. 2003-083553

(51) Int. Cl.
*C08J 3/00* (2006.01)
(52) U.S. Cl. ...................... 523/337; 523/336; 523/201; 523/403; 523/404; 524/901
(58) Field of Classification Search ................ 523/201, 523/336, 337, 403, 404; 524/901
See application file for complete search history.

(56) References Cited

U.S. PATENT DOCUMENTS

| 3,766,105 | A | * | 10/1973 | Chan ........................... 523/216 |
| 5,110,847 | A | * | 5/1992 | Kojima et al. ............... 523/412 |
| 5,135,969 | A | * | 8/1992 | Tooyama et al. ............ 523/404 |
| 7,067,573 | B1 | * | 6/2006 | Serobian ...................... 524/269 |
| 7,101,930 | B2 | * | 9/2006 | Martin et al. ................ 524/522 |

FOREIGN PATENT DOCUMENTS

| EP | 0 381 341 | 8/1990 |
| EP | 0 381 347 | 8/1992 |
| EP | 0 612 818 | 8/1994 |
| JP | 4279679 | 10/1992 |

* cited by examiner

*Primary Examiner*—Sanza L. McClendon
(74) *Attorney, Agent, or Firm*—Jordan and Hamburg LLP

(57) ABSTRACT

In a method of producing an oil-in-water type emulsion containing an internally crosslinked fine resin particle, the fine resin particle is encapsulated in an emulsion particle having an average particle diameter of 0.02 to 0.3 μm. The method includes a step of undergoing phase transition from a water-in-oil type emulsion (Y) which includes a resin (A) having a cationic group or an anionic group, an acid or a base (B) neutralizing 20 to 150 mole percent of the cationic group or the anionic group in the resin (A), an internally crosslinked fine resin particle (C), having an average particle diameter of 0.01 to 0.2 μm, dispersed in an oil phase and an aqueous medium (D) to an oil-in-water type emulsion (Z) by adding the aqueous medium (D) further to the water-in-oil type emulsion (Y).

16 Claims, 8 Drawing Sheets

(Z)

(Y)

phase transition

US 7,351,755 B2

METHOD OF PRODUCING OIL-IN-WATER TYPE EMULSION CONTAINING INTERNALLY CROSSLINKED FINE RESIN PARTICLE, OIL-IN-WATER TYPE EMULSION CONTAINING INTERNALLY CROSSLINKED FINE RESIN PARTICLE, CATION ELECTRODEPOSITION COATING COMPOSITION AND SUBSTANCE COATED

FIELD OF THE INVENTION

The present invention relates to a method of producing an oil-in-water type emulsion containing an internally crosslinked fine resin particle, the oil-in-water type emulsion containing the internally crosslinked fine resin particle, a cation electrodeposition coating composition and a coated substance.

BACKGROUND OF THE INVENTION

Substances to be coated such as automobiles are coated usually by applying an electrodeposition coating, an intermediate coating, a base coating and a clear coating one after another to form a multilayer coating film. In coating used in such coating steps, a technology of adding an internally crosslinked fine resin particle for the purpose of improving a rust-preventive property and controlling viscosity receives attention.

A water-borne coating composition containing such an internally crosslinked fine resin particle is usually produced by mixing water dispersion of the internally crosslinked fine resin particle and a resin emulsion produced besides. Accordingly, the internally crosslinked fine resin particle exists as resin particle distinct from resin components in a coating in the water-borne coating composition. In the coating film formed from such a water-borne coating composition, the internally crosslinked fine resin particle may not adequately disperse in a resin phase in a process of forming a coating film and effects resulting from the internally crosslinked fine resin particle may not be sufficiently exhibited.

On the one hand, in Japanese Kokai Publication Hei-4-279679, there is disclosed a coating containing crosslinked resin particles. However, here, crosslinked particles are not necessarily encapsulated in emulsion particles with reliability. There is also a possibility that it is encapsulated.

In order to improve such issues, it is conceivable that by allowing the internally crosslinked fine resin particle to exist in an oil phase of a resin emulsion in the water-borne coating, the internally crosslinked fine resin particle is highly dispersed in a coating film in the process of forming a film and functions, which the internally crosslinked fine resin particle has, is more efficiently exhibited, but there has been no method of allowing the internally crosslinked fine resin particle to exist in an emulsion particle with reliability. In the present invention, encapsulating with reliability allows effects resulting from the crosslinked particles to be sufficiently exhibited.

On the other hand, cation electrodeposition coatings are widely used as an undercoating having an anticorrosive function because of the workability of coating, which permits coating in any configuration and its safety. Particularly, a cation electrodeposition coating, in which a substance to be coated itself is used as a cathode and energized, becomes prevalent in place of an anion electrodeposition coating because metal ions are not eluted from the substance to be coated.

Since the cation electrodeposition coatings itself is superior in a rust-preventive property, they are widely used in the areas, in which a high rust-preventive property, an excellent appearance and pitting resistance are required, such as a coating system for automobiles. However, since it is difficult to thicken the coating film thickness on an edge portion of a substance to be coated, there are problems that an edge-covering property and a rust-preventive property of an edge portion are poor and improvement of them is desired.

In order to improve the edge-covering property of substances to be coated, it is considered to add an internally crosslinked fine resin particle obtained through a crosslinking reaction in a particle. It is possible to enhance the edge-covering property and to improve the rust-preventive property of an edge portion by controlling the fluidity of the coating in baking through an addition of such the internally crosslinked fine resin particle.

However, when coating is performed with a cation electrodeposition coating using such the internally crosslinked fine resin particle, there may be cases where the internally crosslinked fine resin particle is not adequately dispersed in a not-yet-cured coating film. In such a case, the rust-preventive property of an edge portion may not be adequately improved. Further, by allowing the coating to contain the internally crosslinked fine resin particle, the stability of bath of a cation electrodeposition coating, the electrodeposition properties and the water resistance of coating film may be impaired and further there was a problem that the obtained coating film was low in smoothness.

OBJECT OF THE INVENTION

It is an object of the first present invention to provide a method of producing an oil-in-water type emulsion containing an internally crosslinked fine resin particle, in which an internally crosslinked fine resin particle is encapsulated in an emulsion particle, considering the above-mentioned state of the prior art.

It is an object of the second present invention to provide an oil-in-water type emulsion containing an internally crosslinked fine resin particle, which has high stability and can be favorably used as a cation electrodeposition coating, considering the above-mentioned state of the prior art.

It is an object of the third present invention to provide a cation electrodeposition coating composition which has an excellent rust-preventive property of an edge portion and excellent smoothness of a coating film, can obtain a coating film suppressing oil repellency and is superior in the stability of bath, the electrodeposition properties and the water resistance of a coating film.

SUMMARY OF THE INVENTION

The first present invention is a method of producing an oil-in-water type emulsion containing an internally crosslinked fine resin particle, wherein the fine resin particle is encapsulated in a emulsion particle having an average particle diameter of 0.02 to 0.3 µm, comprising of a step of undergoing phase transition from a water-in-oil type emulsion (Y) comprising of a resin (A) having a cationic group or an anionic group, an acid or a base (B) neutralizing 20 to 150 mole percent of the cationic group or the anionic group in the resin (A), an internally crosslinked fine resin particle (C), having an average particle diameter of 0.01 to 0.2 µm, dispersed in an oil phase and an aqueous medium (D) to an oil-in-water type emulsion (Z) by adding the aqueous medium (D) further to the water-in-oil type emulsion (Y).

In the above-mentioned method of producing an oil-in-water type emulsion containing an internally crosslinked fine resin particle, the above-mentioned water-in-oil type emulsion (Y) is preferably obtained through a step (1-1) of neutralizing the resin (A) by mixing the resin (A) with the acid or base (B) neutralizing 20 to 150 mole percent of the cationic group or anionic group in the resin (A), and a step (1-2) of mixing the neutralized resin (A) obtained through the step (1-1) with water dispersion (W) of the internally crosslinked fine resin particle (C) having an average particle diameter of 0.01 to 0.2 µm to form the water-in-oil type emulsion (Y).

In the above-mentioned method of producing an oil-in-water type emulsion containing an internally crosslinked fine resin particle, the above-mentioned water-in-oil type emulsion (Y) is preferably obtained through a step (2-1) of mixing the water dispersion (W) of the internally crosslinked fine resin particle (C) having an average particle diameter of 0.01 to 0.2 µm with the acid or base (B) neutralizing 20 to 150 mole percent of the cationic group or anionic group in the resin (A) to form a dispersion (V) of the internally crosslinked fine resin particle, and a step (2-2) of mixing the dispersion (V) obtained through the step (2-1) with the resin (A) to form the water-in-oil type emulsion (Y).

The present invention is also a method of producing an oil-in-water type emulsion containing an internally crosslinked fine resin particle, wherein the fine resin particle is encapsulated in a emulsion particle having an average particle diameter of 0.02 to 0.3 µm, comprising of a step of forming an oil-in-water type emulsion (Z) by adding an aqueous medium (D) to an oily medium (X) comprising of a resin (A) having a cationic group or an anionic group, an acid or a base (B) neutralizing 20 to 150 mole percent of the cationic group or the anionic group in the resin (A) and an internally crosslinked fine resin particle (C), having an average particle diameter of 0.01 to 0.2 µm, dispersed in an oil phase.

In the above-mentioned method of producing an oil-in-water type emulsion containing an internally crosslinked fine resin particle, it is preferred that a hydrophobic resin (H) is further dispersed or dissolved in an emulsion particle of the oil-in-water type emulsion containing the internally crosslinked fine resin particle further.

In the above-mentioned method of producing an oil-in-water type emulsion containing an internally crosslinked fine resin particle, it is preferred that the above-mentioned step (1-1) further include a step of adding a hydrophobic resin (H).

The second present invention is an oil-in-water type emulsion containing a internally crosslinked fine resin particle, which comprises of an epoxy resin (A-1) having a cationic group, a blocked isocyanate (H-1) and/or a melamine resin (H-2) and a internally crosslinked fine resin particle (C) having a particle diameter of 0.01 to 0.2 µm, said internally crosslinked fine resin particle (C) being in an oil phase.

In the above-mentioned oil-in-water type emulsion containing the internally crosslinked fine resin particle, 20 to 150 mole percent of the cationic group in the epoxy resin (A-1) is preferably neutralized with acid.

In the above-mentioned oil-in-water type emulsion containing the internally crosslinked fine resin particle, the internally crosslinked fine resin particle (C) is preferably contained in an amount of 1 to 100 weight percent of the epoxy resin (A-1).

In the above-mentioned oil-in-water type emulsion containing the internally crosslinked fine resin particle, the blocked isocyanate (H-1) and/or the melamine resin (H-2) is preferably contained in an amount of 10 to 50 weight percent of the epoxy resin (A-1).

In the above-mentioned oil-in-water type emulsion containing the internally crosslinked fine resin particle, the oil-in-water type emulsion containing the internally crosslinked fine resin particle preferably has an emulsion particle diameter of 0.02 to 0.3 µm.

The third present invention is a cation electrodeposition coating composition comprising of at least the oil-in-water type emulsion containing the internally crosslinked fine resin particle of the second invention and a paste in which a pigment is dispersed.

The fourth present invention is a coated substance obtained by electrodeposition coating of the cation electrodeposition coating composition.

DETAILED DESCRIPTION OF THE INVENTION

Hereinafter, the present invention will be described in detail.

An oil-in-water type emulsion (Z) containing an internally crosslinked fine resin particle produced by the method of the present invention (the first present invention) has an emulsion structure like a schematic diagram shown in FIG. 1. That is, the emulsion particle comprising of resin components exist in an aqueous phase and further the internally crosslinked fine resin particle is dispersed in the above-mentioned emulsion particle. A water-dispersible coating composition based on emulsions having such a conformation becomes a substance in which the internally crosslinked fine resin particle (C) in a not-yet-cured coating film are highly dispersed in components composing a coating film. Therefore, the fluidity of the coating film components in being heated and melted for curing can be controlled and thereby a uniform cured coating film can be attained, and particularly the coating film has the advantage that the coating deficiencies of an edge portion do not occur.

The above-mentioned resin (A) and the above-mentioned internally crosslinked fine resin particle (C) were conventionally produced in conformations of the oil-in-water type emulsion and the water dispersion, respectively, and subsequently they were mixed. Accordingly, the resulting oil-in-water type emulsion had such a structure as a schematic diagram of FIG. 2 and the internally crosslinked fine resin particle (C) were dispersed in an aqueous phase. In a water-dispersible coating composition comprising of such the oil-in-water type emulsion, since the internally crosslinked fine resin particle (C) in a not-yet-cured coating film is not adequately dispersed in resin components, the fluidity of the coating film components in being heated and melted for curing cannot be controlled well and there might be cases where the coating deficiencies of an edge portion occurred.

The first method of producing the oil-in-water type emulsion containing the fine resin particle of the present invention is schematically shown in FIG. 4. In the first present invention, in order to produce the above-mentioned oil-in-water type emulsion (Z) containing the internally crosslinked fine resin particle, a water-in-oil type emulsion (Y), which has a structure as shown in FIG. 3, containing an internally crosslinked fine resin particle is first prepared. In the above-mentioned water-in-oil type emulsion (Y) containing the internally crosslinked fine resin particle, the internally crosslinked fine resin particle (C) is dispersed in an oil phase being a dispersion medium of emulsion. When the water-in-oil type emulsion (Y) is undergone phase transition from the water-in-oil type to the oil-in-water type by adding an aqueous medium (D) to the emulsion (Y), a phase transition occurs while maintaining the internally crosslinked fine resin particle (C) dispersed in an oil phase and thereby the objective oil-in-water type emulsion (Z) containing the internally crosslinked fine resin particle can be produced.

And, the second method of producing the oil-in-water type emulsion containing the fine resin particle of the present invention is schematically shown in FIG. 5. In the second method, first, an oily dispersion (X) comprising of a resin (A) having a cationic group or an anionic group, an acid or a base (B) and an internally crosslinked fine resin particle (C) is prepared. When the oil-in-water type emulsion is prepared by adding an aqueous medium (D) to the above-mentioned oily dispersion (X), the emulsion particle is formed while maintaining the internally crosslinked fine resin particle (C) dispersed in an oil phase and thereby the objective oil-in-water type emulsion (Z) containing the internally crosslinked fine resin particle can be produced.

The above-mentioned resin (A) is not particularly limited and, for example, an epoxy resin, an acrylic resin and a polyester resin can be given. These resins are not particularly limited as long as each resin has a cationic group or an anionic group.

A cationic group of the above-mentioned resin (A) is a functional group that reacts with acid to form salt, and for example, an amino group, a sulfide group, a phosphine group, etc. can be given. These groups are changed to a cationic type in the presence of acid to form an ammonium group, a sulfonium group, and a phosphonium group, respectively. The above-mentioned cationic group is more preferably an amino group.

The above-mentioned resin (A) preferably has an amine value ranging from 30 as a lower limit to 120 as an upper limit when it has an amino group as a cationic group. When the amine value is less than 30, resin cannot exert adequate dispersiblity in water because of the insufficient amine value, and therefore there is a possibility that emulsion formation may become difficult. When it is more than 120, there is a possibility that emulsion formation may become unfavorable since resin exhibits high water solubility. More preferably, the above-mentioned lower limit is 40 and the above-mentioned upper limit is 80.

When the above-mentioned resin (A) has a cationic group, a number-average molecular weight thereof preferably lies within a range of from 800 as a lower limit to 10,000 as an upper limit. When the number-average molecular weight of the above-mentioned resin (A) is less than 800, it is not preferred since it becomes difficult to emulsify the resin (A). When it is more than 10,000, it may become difficult not only to control the viscosity of a resin solution and therefore to synthesize the resin but also to handle the resin (A) in operations such as emulsification and dispersion of the obtained resin. More preferably, the above-mentioned lower limit is 1,000 and the above-mentioned upper limit is 5,000.

As a resin having the above-mentioned amine group, an amino group-containing epoxy resin and an amino group-containing acrylic resin can be given. When the above-mentioned resin (A) is an amino group-containing epoxy resin, it can be produced by ring-opening epoxy rings in a molecule of an epoxy resin of a raw material through a reaction of the epoxy ring with amines such as a primary or secondary amine, or an acid salt of tertiary amine. The above-mentioned epoxy resin of a raw material is not particularly limited and for example, polyphenol polyglycidyl ether type epoxy resin, which is the product of a reaction of a polycyclic phenolic compound such as bisphenol A, bisphenol F, bisphenol S, phenol novolac, cresol novolac or the like and epichlorohydrin, and an oxazolidone ring-containing epoxy resin obtained through a reaction of a diisocyanate compound or a bisurethane compound, which is obtained by blocking a NOC group of a diisocyanate compound with lower alcohol such as methanol, ethanol, etc., and epichlorohydrin can be given.

The above-mentioned cationic acrylic resin is not particularly limited and for example, an acrylic resin obtained by reacting an oxysilane ring of a compound obtained by copolymerizing acrylate, hydroxyl group-containing acrylic monomer (for example, ϵ-caprolactone adduct of hydroxyl group-containing (meth) acrylic ester such as 2-hydroxyethyl(meth)acrylate, 2-hydroxypropyl(meth)acrylate, 2-hydroxyethyl(meth)acrylate) and another acrylic and/or non-acrylic monomer with amine, and an acrylic resin obtained by copolymerizing acrylic monomer having an amino group without using glycidyl (meth) acrylate can be given.

An anionic group of the above-mentioned resin (A) is a functional group which reacts with base to form salt, and for example, a carboxyl group, a sulfonate group, a phosphate group, etc. can be given. The above-mentioned anionic group is more preferably a carboxyl group.

When the above-mentioned resin (A) is a substance having an anionic group, it is preferably a copolymerized acrylic resin obtained by polymerizing a monomer composition comprising of a carboxyl group-containing polymerizable ethylene monomer (E-1) and another polymerizable ethylene monomer (E-2).

The above-mentioned carboxyl group-containing polymerizable ethylene monomer (E-1) is not particularly limited and, for example, acrylic acid, methacrylic acid, acrylic acid dimer, crotonic acid, 2-acryloyloxyethyl phthalate, 2-acryloyloxyethyl succinate, 2-acryloyloxyethyl acid phosphate, 2-acrylamido-2-methyl propane sulfonic acid, w-carboxy-polycaprolactone mono(meth)acrylate, isocrotonic acid, a-hydro-w-((1-oxo-2-propenyl)oxy)poly(oxy(1-oxo-1, 6-hexanediyl)), maleic acid, fumaric acid, itaconic acid, 3-vinyl salicylate, and 3-vinyl acetylsalicylate can be given. Among them, acrylic acid, methacrylic acid and acrylic acid dimer are preferable. These compounds may be used alone or in combination of two or more species of them.

The above-mentioned another polymerizable ethylene monomer (E-2) is not particularly limited and for example, (meth) acrylic ester having 3 or more carbon atoms in an ester portion (for example, n-butyl(meth)acrylate, isobutyl (meth)acrylate, t-butyl(meth)acrylate, 2-ethylhexyl(meth) acrylate, lauryl(meth)acrylate, phenyl acrylate, isobornyl (meth)acrylate, cyclohexyl(meth)acrylate, t-butylcyclohexyl (meth)acrylate, dicyclopentadienyl(meth)acrylate, dihydrodicyclopentadienyl(meth)acrylate,), polymerizable amide compounds (for example, (meth)acrylamide, N-methylol(meth)acrylamide, N,N-dimethyl(meth)acrylamide, N,N-dibutyl(meth)acrylamide, N,N-dioctyl(meth)acrylamide, N-monobutyl(meth)acrylamide, N-monooctyl(meth) acrylamide, 2,4-dihydroxy-4'-vinylbenzophenone, N-(2-hydroxyethyl)acrylamide, N-(2-hydroxyethyl) methacrylamide, etc.), polymerizable aromatic compounds (for example, styrene, α-methylstyrene, vinyl ketone, t-butylstyrene, p-chlorostyrene and vinyl naphthalene), polymerizable nitriles (for example, acrylonitrile, methacrylonitrile, etc.), α-olefins (for example, ethylene, propylene, etc.), vinyl esters (for example, vinyl acetate, vinyl propionate, etc.), diens (for example, butadiene, isoprene, etc.), hydroxyethyl(meth)acrylate, hydroxypropyl(meth)acrylate, hydroxybutyl(meth)acrylate, allyl alcohol, methacrylic alcohol and ε-caprolactone adduct of hydroxyethyl(meth)acrylate can be given. These compounds may be used alone or in combination of two or more species of them.

The above-mentioned resin (A) preferably has an acid value ranging from 10 as a lower limit to 100 as an upper limit when it has an anionic group. When the acid value of the anionic resin is less than 10, resin cannot exert adequate dispersiblity in water and therefore emulsion formation may become difficult. When the acid value is more than 100, emulsion formation may become difficult since resin exhibits high water solubility. More preferably, the above-mentioned lower limit is 15 and the above-mentioned upper limit is 60.

When the above-mentioned resin (A) has an anionic group, a number-average molecular weight thereof preferably lies within a range of from 800 as a lower limit to 50,000 as an upper limit. When the number-average molecular weight of the above-mentioned resin (A) is less than 800, it is not preferred since it becomes difficult to emulsify the resin (A). When the number-average molecular weight of the above-mentioned resin (A) having an anionic group is more than 50,000, it may become difficult not only to control the viscosity of a resin solution and therefore to synthesize the resin but also to handle the resin (A) in operations such as emulsification and dispersion of the obtained resin. More preferably, the above-mentioned lower limit is 1,000 and above-mentioned upper limit is 20,000.

In the present invention, when the above-mentioned resin (A) has a cationic group, an acid neutralizing 20 to 150 mole percent of the cationic group is further used, and when the above-mentioned resin (A) has an anionic group, a base neutralizing 20 to 150 mole percent of the anionic group is further used.

A acid (B) neutralizing the cationic group in the resin (A) is not particularly limited and for example, formic acid, acetic acid, lactic acid, propionic acid, boric acid, butyric acid, dimethylolpropionic acid, hydrochloric acid, sulfric acid, phosphoric acid, N-acetylglycine, N-acetyl-β-alanine, etc. can be given. The above-mentioned acid (B) may be used in combination of two or more species.

A base (B) neutralizing the anionic group in the above-mentioned resin (A) is not particularly limited and for example, inorganic bases such as sodium hydroxide, potassium hydroxide, lithium hydroxide, etc.; and amine compounds such as monomethylamine, dimethylamine, trimethylamine, triethylamine, diisopropylamine, monoethanolamine, diethanolamine, dimethylethanolamine, etc. can be given.

The above-mentioned acid or base (B) needs to be used at the rate of neutralizing 20 mole percent as a lower limit and 150 mole percent as an upper limit of the cationic group or the anionic group. When the above-mentioned rate of neutralization is less than 20 mole percent, the resin (A) is not adequately dispersed in water and emulsion may not be formed. Even when the acid or base (B) is blended at the rate of neutralizing more than 150 mole percent, increase in dispersibility does not occur. More preferably, the above-mentioned lower limit is 30 mole percent and the above-mentioned upper limit is 100 mole percent.

The above-mentioned internally crosslinked fine resin particle (C) is a fine resin particle, comprising of resin having a crosslinking structure, having an average particle diameter of 0.01 to 0.2 μm. As the above-mentioned internally crosslinked fine resin particle (C), there can be given, but not particularly limited to, a fine resin particle comprising of resin having a crosslinking structure based on an ethylenic unsaturated monomer, a fine resin particle comprising of a urethane resin internally crosslinked, and a fine resin particle comprising of a melamine resin internally crosslinked, etc.

As the above-mentioned a resin having a crosslinking structure based on an ethylenic unsaturated monomer, there can be given, but not particularly limited to, water dispersion prepared through suspension polymerization or emulsion polymerization of a monomer composition containing a crosslinkable monomer as an essential component and an ethylenic unsaturated monomer as required in an aqueous medium, or an internally crosslinked fine resin particle obtained by eliminating water content of the above-mentioned water dispersion through a technique such as the substitution of a solvent for, azeotropic distillation of, centrifugation of, or baking of the above-mentioned water dispersion, or an internally crosslinked fine resin particle obtained by a NAD method or a precipitation method of dispersing an internally crosslinked fine resin particle copolymer obtained by copolymerizing a monomer composition containing a crosslinkable monomer as an essential component and an ethylenic unsaturated monomer as required in a low polar organic solvent such as aliphatic hydrocarbons or in a non-aqueous organic solvent dissolving a monomer but not dissolving a polymer like a high polar organic solvent among esters, ketones and alcohols.

The above-mentioned ethylenic unsaturated monomer is not particularly limited and for example, alkyl esters of acrylic acid or methacrylic acid such as methyl(meth)acrylate, ethyl(meth)acrylate, n-butyl(meth)acrylate, isobutyl (meth)acrylate, 2-ethylhexyl(meth)acrylate, etc.; styrene, α-methylstyrene, vinyl toluene, t-butylstyrene, ethylene, propylene, vinyl acetate, vinyl propionate, acrylonitrile, methacrylonitrile and dimethylaminoethyl(meth)acrylate can be given. The above-mentioned ethylenic unsaturated monomer may be used alone or in combination of two or more species of them.

The above-mentioned crosslinkable monomer is not particularly limited and, for example, a monomer having two or more radically polymerizable ethylenic unsaturated bonds in a molecule and a monomer containing two kinds of ethylenic unsaturated group respectively bearing groups capable of reacting with each other can be given.

The above-mentioned monomer having two or more radically polymerizable ethylenic unsaturated groups, which can be used for producing an internally crosslinked fine resin particle, in a molecule is not particularly limited and, for example, polymerizable unsaturated mono carboxylate esters of polyhydric alcohol such as ethylene glycol diacrylate, ethylene glycol dimethacrylate, triethylene glycol dimethacrylate, tetraethylene glycol dimethacrylate, 1,3-butylene glycol dimethacrylate, trimethylol propane triacrylate, trimethylol propane trimethacrylate, 1,4-butanediol diacrylate, neopentyl glycol diacrylate, 1,6-hexane diol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxy dimethacrylate, 1,1,1-trishydroxymethylethane diacrylate, 1,1,1-trishydroxymethylethane triacrylate, 1,1,1-trishydroxymethylethane dimethacrylate, 1,1,1-trishydroxymethylethane trimethacrylate, 1,1,1-trishydroxymethylpropane diacrylate, 1,1,1-trishydroxymethylpropane triacrylate, 1,1,1-trishydroxymethylpropane dimethacrylate, 1,1,1-trishydroxymethylpropane trimethacrylate, etc.; polymerizable unsaturated alcohol esters of polybasic acid such as triallyl cyanurate, triallyl isocyanurate, triallyl trimeritate, diallyl terephthalate, diallyl phthalate, etc.; and aromatic compounds having two or more vinyl substituents such as divinylbenzene can be given.

A combination of functional groups, which exist in the above-mentioned monomer, having two kinds of ethylenic unsaturated group respectively bearing groups capable of reacting with each other, and react with each other, is not particularly limited and, for example, a combination of an epoxy group and a carboxyl group, an amine group and a carbonyl group, an epoxy group and a carboxylic acid anhydride group, an amine group and a carboxylic acid chloride group, an alkylene imine group and a carbonyl group, an organoalkoxysilane group and a carboxyl group, and a hydroxyl group and an isocyanate glycidyl acrylate group can be given. Among them, the combination of an epoxy group and a carboxyl group is more preferable.

As the monomer having two kinds of ethylenic unsaturated group in the above-mentioned combination of an epoxy group and a carboxyl group, there can be given combinations of epoxy group-containing ethylenic unsaturated monomers such as glycidyl methacrylate, etc. and carboxyl group-containing ethylenic unsaturated monomers such as acrylic acid, methacrylic acid, crotonic acid, etc.

Preferably, the above-mentioned internally crosslinked fine resin particle (C) has an ionized group having the same polarity as resin to be used in order to be encapsulated stably into emulsion. That is, preferably, the internally crosslinked fine resin particle (C) bears a cationic group such as an amino group, a quaternary ammonium or the like in the case where the present invention is a method of using the above-mentioned cationic resin, and bears an anionic group such as a carboxyl group, a sulfonate group or the like in the case of being a method of using above-mentioned anionic group. In order to realize this, in synthesizing, a cationic internally crosslinked fine resin particle is obtained by using a cationic emulsifier or a cationic initiator in the case of using the above-mentioned cationic resin and an anionic internally crosslinked fine resin particle is obtained by using an anionic emulsifier or an anionic initiator in the case of using the above-mentioned anionic resin.

The above-mentioned internally crosslinked fine resin particle comprising of resin having a crosslinking structure based on an ethylenic unsaturated monomer can also be obtained by milling the polymer obtained through solution polymerization or bulk polymerization of the above-mentioned monofunctional ethylenic unsaturated monomer and a crosslinkable monomer and classifying the milled particle into the particle of 0.01 to 0.2 μm.

The above-mentioned fine resin particle comprising of an internally crosslinked urethane resin is a fine resin particle comprising of a polyurethane polymer obtained by reacting a polyisocyanate component with diol having a hydroxyl group at an end and diol having a carboxyl group or an active hydrogen-containing component having triol to form an isocyanate end group-containing polyurethane prepolymer, which has carbonate salt at a side chain, and subsequently reacting the formed polyurethane prepolymer with an active hydrogen-containing chain extention agent.

As a polyisocyanate component used for the above-mentioned prepolymer, there can be given aromatic diisocyanates such as diphenylmethane-4,4'-diisocyanate, trilene diisocyanate, xylylene diisocyanate; aliphatic diisocyanates such as hexamethylene diisocyanate, 2,2,4-trimethylhexane diisocyanate, etc.; and alicyclic diisocyanates such as 1-cyclohexane diisocyanate, 1-isocyanate-3-isocyanatemethyl-3,5-trimethylcyclohexane (isophorone diisocyanate), 4,4'-dicyclohexylmethane diisocyanate, methylcyclohexylene isocyanate, etc. The above-mentioned polyisocyanate component is more preferably hexamethylene diisocyanate or isophorone diisocyanate.

The above-mentioned diol having a hydroxyl group at an end thereof is not particularly limited and, for example, polyetherdiol, polyesterdiol or polycarbonate diol, which has a molecular weight of 100 to 5,000 can be given. The above-mentioned diol having a hydroxyl group at an end thereof is not particularly limited and, for example, polyethylene glycol, polypropylene glycol, polytetramethylene glycol, polybutylene adipate, polyhexamethylene adipate, polyneopentyl adipate, polycaprolactone diol, poly-3-methylvalerolactone diol and polyhexamethylene carbonate can be given.

The above-mentioned diol having a carboxyl group is not particularly limited and for example, dimethylolacetic acid, dimethylolpropionic acid, dimethylolbutyric acid, etc. can be given. Among them, dimethylolpropionic acid is preferable.

The above-mentioned triol is not particularly limited and for example, trimethylolpropane, trimethylolethane, glycerin polycaprolactone triol, etc. are given. By using triol, a urethane resin particle takes on a crosslinking structure internally.

The above-mentioned fine resin particle comprising of an internally crosslinked melamine resin is not particularly limited and for example, a particle of the internally crosslinked melamine resin obtained by dispersing a melamine resin and polyol in water in the presence of an emulsifier and then crosslinking the melamine resin with the polyol in a particle can be given.

The above-mentioned melamine resin is not particularly limited and for example, di-, tri-, tetra-, penta-, hexamethylolmelamine, and alkyl etherate thereof (alkyl is methyl, ethyl, propyl, iso propyl, butyl, or isobutyl) can be given. As a commercially available melamine resin describes above, there are given, for example, CYMEL 303, CYMEL 325, CYMEL 1156 (each manufactured by MITSUI CYTEC CORPORATION).

The above-mentioned polyol is not particularly limited and, for example, triol or tetrol, which has a molecular weight of 500 to 3,000 can be given. The above-mentioned polyol is more preferably polypropylene ether triol and polyethylene ether triol.

In a method of producing the oil-in-water type emulsion containing the internally crosslinked fine resin particle of the present invention, as the above-mentioned internally crosslinked fine resin particle (C), the internally crosslinked fine resin particle may be isolated through filtering, spray drying, frozen drying, etc. and used as-is or milled into a proper particle size using a mill, etc. to be used in a condition of powder, or the obtained water dispersion may be used for the method of producing an oil-in-water type emulsion containing a fine resin particle of the present invention as-is or by substituting a solvent for the medium.

The above-mentioned internally crosslinked fine resin particle (C) have an average particle diameter ranging from 0.01 μm as a lower limit to 0.2 μm as an upper limit. When the average particle diameter is smaller than 0.01 μm, the particle is poor at handling and tends to flocculate because of their too small size. When it is larger than 0.2 μm, the dispersion of the particle becomes difficult because of coarse particle size. More preferably, the above-mentioned lower limit is 0.03 µm and the above-mentioned upper limit is 0.12 µm.

The above-mentioned oil-in-water type emulsion (Z) containing the internally crosslinked fine resin particle may further contain a hydrophobic resin (H) in addition to components of from the above-mentioned (A) to the above-mentioned (D). The above-mentioned hydrophobic resin (H) is preferably dissolved in an oil phase component in the above-mentioned emulsion particle.

The above-mentioned hydrophobic resin (H) is not particularly limited and any hydrophobic resin such as a polyester resin, a polyepoxy resin, a polyurethane resin, a polyacrylic resin, a melamine resin, a novolac resin, a resol resin, etc. may be used. As such a hydrophobic resin (H), there can be more specifically given, for example, a crosslinking agent, a flow agent and the like.

The above-mentioned crosslinking agent is not particularly limited and, for example, blocked isocyanates and melamine resins can be given. The above-mentioned blocked polyisocyanate is a compound in which an isocyanate group of polyisocyanate having two or more isocyanate groups is protected with a block agent.

The above-mentioned polyisocyanate is not particularly limited and, for example, aliphatic diisocyanates such as hexamethylene diisocyanate (including a trimer), tetramethylene diisocyanate, trimethylhexamethylene diisocyanate, etc.; alicyclic polyisocyanates such as isophorone diisocyanate, 4,4'-methylenebis(cyclohexyl isocyanate), etc.; and aromatic diisocyanates such as 4,4'-diphenylmethane diisocyanate, trilene diisocyanate, xylylene diisocyanate, etc. can be given.

The above-mentioned block agent is not particularly limited and, for example, monohydric alkyl (or aromatic) alcohols such as n-butanol, n-hexyl alcohol, 2-ethylhexanol, lauryl alcohol, phenol carbinol, methyl phenyl carbinol and the like; cellosolves such as ethylene glycol monohexyl ether, ethylene glycol mono-2-ethylhexyl ether and the like; phenols such as phenol, p-t-butylphenol, cresol and the like; oximes such as dimethyl ketoxime, methyl ethyl ketoxime, methyl isobutyl ketoxime, methyl amyl ketoxime, cyclohexanone oxime and the like; and lactams represented by ε-caprolactam and γ-butyrolactam can be given. Since block agents of oximes and lactams dissociate at low temperatures, they are more preferable from the viewpoint of curability of resin.

The above-mentioned block agent may be used alone or in combination of two or more species. A ratio of blocked group is preferably 100% from the viewpoint of securing the storage stability of the obtained oil-in-water type emulsion.

The above-mentioned melamine resin is not particularly limited and for example, the melamine resin, described in the above-mentioned internally crosslinked fine resin particle can be given.

The above-mentioned flow agent is not particularly limited and, for example, a hydrophobic polyester resin can be given. The above-mentioned hydrophobic polyester resin can be obtained by polyesterification of polyol and polycarboxylic acid or acid anhydride. The above-mentioned polyol is not particularly limited and, for example, tetraols such as a dimmer of pentaerythritol or trimethylol propane; triols such as trimethylol propane, hexane triol, etc.; and diols such as 1,9-nonanediol, 2-methyl-1,8-octanediol, neopentyl glycol, hydroxypivalic neopentyl glycol, 3-methyl-1,5-pentanediol, 1,5-pentanediol, 1,6-hexanediol, 1,4-butanediol, 2-methyl-1,3-propylene glycol, propylene glycol, hexylene glycol, ethylene glycol, diethylene glycol, hydrogenated bisphenol A, caprolactone diol, bishydroxyethyl taurine and reduced forms of dimer acids can be given.

And, particularly, the feature of the present invention is outstandingly exerted by using conjugated alkadiene diol having a polymerization degree of 5 to 50 alone, a hydrogenated substance of this diol alone or a mixture thereof as the above-mentioned polyol. These diols are derived from conjugated alkadiene oligomer or polymer, having a polymerization degree of 5 to 50. Their molecular weights preferably lie within a range of 1,000 to 4,000, particularly a range of 1,500 to 3,000. Specifically, for example, 1,4-polyisoprenediol, 1,4- and 1,2-polybutadienediol, and a hydrogenated substance of these diols are preferred. These are commercially available and EPOL (trade mark) (hydrogenated polyisoprenediol, molecular weight 1,860, average polymerization degree 26, produced by Idemitsu Petrochemical Co.,Ltd), PIP (trade mark) (polyisoprenediol, molecular weight 2,200, average polymerization degree 34, produced by Idemitsu Petrochemical Co.,Ltd), Polytail HA (trade mark) (hydrogenated polybutadienediol, molecular weight 2,200, average polymerization degree 39, produced by MITSUBISHI CHEMICAL CORPORATION), Polytail H (trade mark) (hydrogenated polybutadienediol, molecular weight 2,350, average polymerization degree 42, produced by MITSUBISHI CHEMICAL CORPORATION), and R-45HT (trade mark) (polybutadienediol, molecular weight 2,270, average polymerization degree 42, produced by Idemitsu Petrochemical Co.,Ltd) can be exampled.

The above-mentioned polycarboxylic acid is not particularly limited and for example, isophthalic acid, terephthalic acid, tetrahydrophthalic acid, adipic acid, trimellitic acid, azelaic acid, sebacic acid, succinic acid, cyclohexanedicarboxylic acid, maleic acid, dimer acid, etc. can be given. The above-mentioned acid anhydride is not particularly limited and for example, the acid anhydride of the above-mentioned polycarboxylic acid can be given.

Preferably, the above-mentioned hydrophobic polyester resin has a number-average molecular weight ranging from 500 as a lower limit to 10,000 as an upper limit. When the number-average molecular weight thereof is less than 500, the hardness and water resistance of a coating film is deteriorated, and when it is more than 10,000, the smoothness of a coating film is deteriorated. The above-mentioned lower limit is more preferably 800, and furthermore preferably 1,000. The above-mentioned upper limit is more preferably 8,000, and furthermore preferably 6,000.

The above-mentioned hydrophobic polyester resin preferably has an acid value of less than 15 mgKOH/g. When the acid value is 15 mgKOH/g or more, the water resistance of a coating film is deteriorated. The acid value is more preferably less than 10 mgKOH/g and furthermore preferably less than 8 mgKOH/g.

The above-mentioned hydrophobic polyester resin can impart plasticity and flexibility to a coating film. Also, since it is a hydrophobic resin, it can improve the workability, particularly a popping property.

The oil-in-water type emulsion containing the fine resin particle produced according to the present invention may contain any another component in addition to the above-mentioned components as required.

In the first method of producing the oil-in-water type emulsion (Z) containing the internally crosslinked fine resin particle of the present invention, first, a water-in-oil type emulsion (Y), composed of components of from the above-mentioned (A) to the above-mentioned (D) and of the above-mentioned (H) used as required, is produced. The above-mentioned water-in-oil type emulsion (Y) is one expressed by a schematic diagram shown in FIG. 3. A method of producing the above-mentioned water-in-oil type emulsion (Y) is not particularly limited and, for example, a method shown in FIG. 6 and a method shown in FIG. 7 can be given.

The method shown in FIG. 6 is a method comprising of a step (1-1) of neutralizing a resin (A) having a cationic group or an anionic group by mixing the resin (A) with an acid or a base (B) neutralizing 20 to 150 mole percent of the cationic group or anionic group in the above-mentioned resin (A), and a step (1-2) of mixing the neutralized resin (A) obtained through the above-mentioned step (1-1) with water dispersion (W) of an internally crosslinked fine resin particle (C) to form the water-in-oil type emulsion (Y).

In the above-mentioned method, first, the resin (A) is neutralized with an acid or abase (B) according to a usual method [step (1-1)]. In performing the above-mentioned step (1-1), the water-in-oil type emulsion may be formed by using a small amount of aqueous medium.

When the objective oil-in-water type emulsion containing the internally crosslinked fine resin particle contains a hydrophobic resin (H), it is preferred to mix the hydrophobic resin (H) in the above-mentioned step (1-1). Mixing the hydrophobic resin (H) in the above-mentioned step (1-1) causes the hydrophobic resin (H) to exist in an oil phase.

Then, the water-in-oil type emulsion (Y) is prepared by mixing the water dispersion (W) of the internally crosslinked fine resin particle (C) into the neutralized resin (A) obtained through the above-mentioned step (1-1). A method of preparing the above-mentioned water-in-oil type emulsion (Y) is not particularly limited and a usual method of preparing a water-in-oil type emulsion can be used.

The method shown in FIG. 7 is a method comprising of a step (2-1) of mixing the water dispersion (W) of the internally crosslinked fine resin particle (C) having an average particle diameter of 0.01 to 0.2 μm with an acid or a base (B) neutralizing 20 to 150 mole percent of a cationic group or an anionic group in the resin (A) having a cationic group or an anionic group to form dispersion (V), and a step (2-2) of mixing the dispersion (V) obtained through the above-mentioned step (2-1) with the above-mentioned resin (A) to form the water-in-oil type emulsion (Y).

In the above-mentioned step (2-1), the dispersion (V) is formed by adding a predetermined amount of acid or base (B) to the above-mentioned water dispersion (W) of the internally crosslinked fine resin particle (C).

Then, the water-in-oil type emulsion (Y) is prepared by mixing the above-mentioned dispersion (V) with the above-mentioned resin (A) [step (2-2)]. Through the above-mentioned step, an oil phase containing the above-mentioned resin (A) becomes a dispersion medium, and water in the dispersion (V) and components dissolved in this water become an emulsion particle. In this time, the internally crosslinked fine resin particle(C) are not dispersed in an emulsion particle comprising of an aqueous medium but dispersed in the oil phase comprising of the resin (A). A method of preparing the above-mentioned water-in-oil type emulsion (Y) is not particularly limited and for example, a usual method of preparing the water-in-oil type emulsion may be used.

When the objective oil-in-water type emulsion containing the internally crosslinked fine resin particle contains a hydrophobic resin (H), it is preferred to mix the hydrophobic resin (H) in the above-mentioned step (2-2). Mixing the hydrophobic resin (H) in the above-mentioned step (2-2) causes the hydrophobic resin (H) to exist in an oil phase.

The first method of producing the oil-in-water type emulsion containing the internally crosslinked fine resin particle of the present invention comprises of a step of producing the objective oil-in-water type emulsion (Z) containing the internally crosslinked fine resin particle by adding an aqueous medium (D) to the water-in-oil type emulsion (Y) obtained by the above-mentioned method to phase transition to the oil-in-water type. In the above-mentioned step, the aqueous medium (D) to be used is based on water and may contain a hydrophilic solvent as required.

Addition of the above-mentioned aqueous medium is preferably performed according to a method of adding the aqueous medium (D) gradually while stirring the water-in-oil type emulsion (Y).

The second method of producing the above-mentioned oil-in-water type emulsion (Z) containing the internally crosslinked fine resin particle of the present invention is schematically shown in FIG. 5. The above-mentioned second method is a method in which an oily dispersion (X) is prepared by mixing the components of the above-mentioned (A), (B) and (C), and (H) used as required and the objective oil-in-water type emulsion containing the fine resin particle is produced by adding an aqueous medium (D) to the above-mentioned oily dispersion (X) and emulsifying the mixture.

The first method of the present invention described above can be favorably used when the internally crosslinked fine resin particle (C) to be used is water dispersion, and the second method described above can be favorably used when the internally crosslinked fine resin particle (C) to be used is solvent dispersion. And, when the internally crosslinked fine resin particle (C) is non-solvent, any method of the above-mentioned first and second methods may be used.

With respect to the oil-in-water type emulsion (Z) containing the internally crosslinked fine resin particle, produced by the above-mentioned methods, it was verified by measuring a particle size distribution that it has a structure shown in FIG. 1. That is, in the case of the oil-in-water type emulsion containing internally crosslinked fine resin particle having form shown in FIG. 2, when the particle size distribution is measured, two peaks, namely a peak resulting from the internally crosslinked fine resin particle (C) and a peak resulting from the resin emulsion particle, appear. However, the oil-in-water type emulsion (Z) containing the internally crosslinked fine resin particle, produced by the methods of the present invention, exhibits only single peak in measuring the particle size distribution. From this point, it is apparent that in accordance with the production method of the present invention, the oil-in-water type emulsion (Z) containing the internally crosslinked fine resin particle, which has a structure illustrated in FIG. 1, is obtained.

In measuring the above-mentioned particle size distribution, the oil-in-water type emulsion (Z) containing the internally crosslinked fine resin particle, obtained by the production method of the present invention, preferably have an average particle diameter, obtained from the particle size distribution, ranging from 0.02 μm as a lower limit to 0.3 μm as an upper limit.

In the oil-in-water type emulsion containing the fine resin particle of the present invention, the rate of components of from (A) to (D) and (H) to be used can be appropriately set in response to an emulsion composition intended to be attained. When the obtained the oil-in-water type emulsion containing the fine resin particle is used in water-borne coating, generally, it is preferred to use the internally crosslinked fine resin particle (C) in an amount of within the range from 1 weight percent as a lower limit to 20 weight percent as an upper limit with respect to the resin (A). When the amount of the internally crosslinked fine resin particle (C) is less than 1 weight percent, there may be cases where the effect of controlling the viscosity of a coating film is not exerted sufficiently. Further, when it is more than 20 weight percent, a problem that it is hard to obtain the stable emulsion may arise.

And when the hydrophobic resin (H) is used in waterborne coating, generally, it is preferred to use the hydrophobic resin (H) in an amount of within the range from 0 weight percent as a lower limit to 200 weight percent as an upper limit with respect to the resin (A). When the amount of the hydrophobic resin (H) is more than 200 weight percent, a problem that it is hard to obtain the stable emulsion may arise.

An oil-in-water type emulsion (Z) containing an internally crosslinked fine resin particle produced by the above-mentioned method can be used, for example, for an electrodeposition coating composition. An electrodeposition coating composition formed by using the above-mentioned oil-in-water type emulsion (Z) containing the internally crosslinked fine resin particle can control its viscosity in being melted in a baking step since the internally crosslinked fine resin particle (C) is highly dispersed in an oil phase, and therefore it has excellent properties in a rust-preventive property at an edge portion, smoothness of a surface and an inhibition effect of oil repellency.

The oil-in-water type emulsion containing the internally crosslinked fine resin particle produced by the above-mentioned method can be used in a base coating composition, an intermediate coating composition or the like. The base coating composition, formed by using the above-mentioned oil-in-water type emulsion (Z) containing the internally crosslinked fine resin particle, can control its viscosity in being melted for curing since the internally crosslinked fine resin particle (C) is highly dispersed in an oil phase, and therefore it has excellent properties of appearance such as smoothness of a surface and like.

A oil-in-water type emulsion containing an internally crosslinked fine resin particle of the second present invention comprises of an epoxy resin (A-1) having a cationic group, a blocked isocyanate (H-1) and/or a melamine resin (H-2), and an internally crosslinked fine resin particle (C) and the above-mentioned internally crosslinked fine resin particle (C) is dispersed in an oil phase. Thereby, the above-mentioned oil-in-water type emulsion containing the internally crosslinked fine resin particle becomes an emulsion which can be favorably used as a cation electrodeposition coating composition.

The oil-in-water type emulsion containing the internally crosslinked fine resin particle of the second present invention has a structure as shown in FIG. 1. That is, emulsion particle 2, comprising of an epoxy resin (A-1), a blocked isocyanate (H-1) and/or a melamine resin (H-2), and an internally crosslinked fine resin particle (C), is dispersed in an aqueous medium 3 being a dispersion medium and thereby the oil-in-water type emulsion is formed.

When the oil-in-water type emulsion having such a structure is used as a cation electrodeposition coating composition, the above-mentioned internally crosslinked fine resin particle (C) are highly dispersed in a not-yet-cured coating film formed by cation electrodeposition coating. Therefore, the fluidity of the coating film components in being heated and melted for curing can be controlled and thereby a uniform cured coating film can be obtained and particularly it has the advantage that the coating deficiencies of an edge portion do not occur. Further, the coating film thus obtained has excellent smoothness.

A cationic group in the above-mentioned epoxy resin (A-1) is a functional group which reacts with acid to form salt, and for example, an amino group, a sulfide group, a phosphine group, etc. can be given. These groups are changed to a cationic type in the presence of acid to form an ammonium group, a sulfonium group, and a phosphonium group, respectively. The above-mentioned cationic group is more preferably an amino group.

The above-mentioned epoxy resin (A-1) preferably has an amine value ranging from 30 as a lower limit to 120 as an upper limit when the cationic group is an amino group. When the amine value of the above-mentioned epoxy resin (A-1) is less than 30, resin cannot exert adequate dispersiblity in water because of the insufficient amine value, and therefore there is a possibility that emulsion formation may become difficult. When it is more than 120, there is a possibility that emulsion formation may become unfavorable since resin exhibits high water solubility. More preferably, the above-mentioned lower limit is 40 and the above-mentioned upper limit is 80.

Preferably, the above-mentioned epoxy resin (A-1) has a number-average molecular weight ranging from 800 as a lower limit to 3,000 as an upper limit. When the number-average molecular weight of the above-mentioned epoxy resin (A-1) is less than 800, it is not preferred since it becomes difficult to emulsify the epoxy resin (A-1). When it is more than 3,000, it may become difficult not only to control the viscosity of a resin solution and therefore to synthesize the resin but also to handle the epoxy resin (A-1) in operations such as emulsification and dispersion of the obtained resin. More preferably, the above-mentioned lower limit is 1,000 and above-mentioned upper limit is 2,000.

A method of introducing the above-mentioned carboxyl group into resin is not particularly limited and for example, a method of reacting an epoxy group in resin, which has such an epoxy group as a bisphenol A type epoxy resin or a novolac type epoxy resin, with amines such as a primary or secondary amine, or an acid salt of tertiary amine, and a method of preparing polymer by using a monomer having a cationic group such as an amino group, a monoalkyl amino group, a dialkyl amino group, etc. can be given.

The above-mentioned epoxy resin (A-1) can be produced by ring-opening epoxy rings in a molecule of an epoxy resin of a raw material through a reaction of the epoxy ring with amines such as a primary or secondary amine, or an acid salt of tertiary amine. An example of the above-mentioned epoxy resin of a raw material is not particularly limited and specifically polyphenol polyglycidyl ether type epoxy resin, which is the product of a reaction of a polycyclic phenolic compound such as bisphenol A, bisphenol F, bisphenol S, phenol novolac, cresol novolac or the like and epichlorohydrin, and an oxazolidone ring-containing epoxy resin obtained through a reaction of a diisocyanate compound or a bisurethane compound, which is obtained by blocking a NOC group of a diisocyanate compound with lower alcohol such as methanol, ethanol, etc., and epichlorohydrin can be given.

The above-mentioned an epoxy resin of a raw material may be one of which a chain is extended by difunctional polyester polyol, polyether polyol, bisphenols, dibasic carboxylic acid, etc. And, it may be epoxy resins obtained by adding monohydroxy compound such as 2-ethylhexanol, nonylphenol, ethylene glycol mono-2-ethylhexyl ether, propylene glycol mono-2-ethylhexyl ether to a part of epoxy rings for the purpose of adjusting a molecular weight or an amine equivalent, improvement in a thermal flow property, or the like.

Amines capable of being used for introducing an amino group by ring-opening an epoxy ring of the above-mentioned epoxy resin of a raw material is not particularly limited and a primary or secondary amine, or an acid salt of tertiary amine such as butyl amine, octyl amine, diethylamine, dibutyl amine, methylbutyl amine, monoethanolamine, diethanolamine, N-methylethanolamine, acid salt of triethylamine, acid salt of N,N-dimethylethanolamine etc can be given.

And, primary amine-containing secondary amine blocked with ketimine such as aminoethylethanolamine methylisobutyl ketimine can also be used. These amines need to be reacted at least at an equivalent epoxy rings in order to ring-open all epoxy rings. A reaction for obtaining the above-mentioned epoxy resin (A-1) is preferably performed through a reaction in a solution using an organic solvent as a solvent.

With respect to the cationic group of the above-mentioned epoxy resin (A-1), a basic group thereof is preferably neutralized with acid in the rate of 20 mole percent (lower limit)-150 mole percent (upper limit) of the cationic group. The above-mentioned acid neutralizing the epoxy resin (A-1) is not particularly limited and for example, formic acid, acetic acid, lactic acid, propionic acid, boric acid, butyric acid, dimethylolpropionic acid, hydrochloric acid, sulfuric acid, phosphoric acid, N-acetylglycine, N-acetyl-b-alanine, etc. can be given. The above-mentioned acid is preferably used at the rate of neutralizing 20 mole percent as a lower limit and 150 mole percent as an upper limit of the cationic group. When the above-mentioned rate of neutralization is less than 20 mole percent, the above-mentioned epoxy resin (A-1) is not adequately dispersed in water and emulsion may not be formed. Even when the acid is blended at the rate of neutralizing more than 150 mole percent, increase in dispersibility does not occur. More preferably, the above-mentioned lower limit is 30 mole percent and the above-mentioned upper limit is 100 mole percent.

The above-mentioned blocked isocyanate (H-1) is a compound in which an isocyanate group of polyisocyanate having two or more isocyanate groups is protected with a block agent. The above-mentioned polyisocyanate is not particularly limited and, for example, aliphatic diisocyanates such as hexamethylene diisocyanate (including a trimer), tetramethylene diisocyanate, trimethylhexamethylene diisocyanate, etc.; alicyclic polyisocyanates such as isophorone diisocyanate, 4,4'-methylenebis (cyclohexyl isocyanate), etc.; and aromatic diisocyanates such as 4,4'-diphenylmethane diisocyanate, trilene diisocyanate, xylylene diisocyanate, etc. can be given.

The above-mentioned block agent is not particularly limited and, for example, monohydric alkyl (or aromatic) alcohols such as n-butanol, n-hexyl alcohol, 2-ethylhexanol, lauryl alcohol, phenol carbinol, methyl phenyl carbinol and the like; cellosolves such as ethylene glycol monohexyl ether, ethylene glycol mono-2-ethylhexyl ether and the like; phenols such as phenol, p-t-butylphenol, cresol and the like; oximes such as dimethyl ketoxime, methyl ethyl ketoxime, methyl isobutyl ketoxime, methyl amyl ketoxime, cyclohexanone oxime and the like; and lactams represented by ε-caprolactam and γ-butyrolactam can be given. Since block agents of oximes and lactams dissociate at low temperatures, they are more preferable from the viewpoint of curability of resin.

The above-mentioned block agent may be used alone or in combination of two or more species of them. A ratio of blocked group is preferably 100% from the viewpoint of securing the storage stability of the oil-in-water type emulsion containing the internally crosslinked fine resin particle.

The above-mentioned melamine resin (H-2) is not particularly limited and for example, di-, tri-, tetra-, penta-, hexa-methylolmelamine, and alkyl etherate thereof (alkyl is methyl, ethyl, propyl, iso propyl, butyl, or isobutyl) can be given. As a commercially available melamine resin describes above, there are given, for example, CYMEL 303, CYMEL 325, CYMEL 1156 (each manufactured by AMERICAN CYANAMID COMPANY).

The above-mentioned internally crosslinked fine resin particle (C) is the fine resin particle, comprising of resin having a crosslinking structure, having an average particle diameter of 0.01 to 0.2 µm. As the above-mentioned internally crosslinked fine resin particle (C), there can be given, but not particularly limited to, a fine resin particle comprising of resin having a crosslinking structure based on an ethylenic unsaturated monomer, a fine resin particle comprising of a urethane resin internally crosslinked fine resin particle comprising of a melamine resin internally crosslinked, etc.

As the above-mentioned a resin having a crosslinking structure based on an ethylenic unsaturated monomer, there can be given, but not particularly limited to, water dispersion prepared through suspension polymerization or emulsion polymerization of a monomer composition containing a crosslinkable monomer as an essential component and an ethylenic unsaturated monomer as required in an aqueous medium, or an internally crosslinked fine resin particle obtained by eliminating water content of the above-mentioned water dispersion through a technique such as the substitution of a solvent for, azeotropic distillation of, centrifugation of, or drying of the above-mentioned water dispersion, or an internally crosslinked fine resin particle obtained by a NAD method or a precipitation method of dispersing an internally crosslinked fine resin particle copolymer obtained by copolymerizing a monomer composition containing a crosslinkable monomer as an essential component and an ethylenic unsaturated monomer as required in a hydrophobic organic solvent such as aliphatic hydrocarbons or in a non-aqueous organic solvent dissolving a monomer but not dissolving a polymer like a hydrophilic organic solvent among esters, ketones and alcohols.

The above-mentioned ethylenic unsaturated monomer is not particularly limited and for example, alkyl esters of acrylic acid or methacrylic acid such as methyl(meth)acrylate, ethyl(meth)acrylate, n-butyl(meth)acrylate, isobutyl (meth)acrylate, 2-ethylhexyl(meth)acrylate, etc.; styrene, a-methylstyrene, vinyl toluene, t-butylstyrene, ethylene, propylene, vinyl acetate, vinyl propionate, acrylonitrile, methacrylonitrile and dimethylaminoethyl(meth)acrylate can be given. The above-mentioned ethylenic unsaturated monomer may be used alone or in combination of two or more species of them.

The above-mentioned crosslinkable monomer is not particularly limited and, for example, a monomer having two or more radically polymerizable ethylenic unsaturated bonds in a molecule and a monomer containing two kinds of ethylenic unsaturated group respectively bearing groups capable of reacting with each other can be given.

The above-mentioned monomer having two or more radically polymerizable ethylenic unsaturated groups in a molecule, which can be used for producing the above-mentioned internally crosslinked fine resin particle, is not particularly limited and, for example, polymerizable unsaturated mono carboxylate esters of polyhydric alcohol such as ethylene glycol diacrylate, ethylene glycol dimethacrylate, triethylene glycol dimethacrylate, tetraethylene glycol dimethacrylate, 1,3-butylene glycol dimethacrylate, trimethylol propane triacrylate, trimethylol propane trimethacrylate, 1,4-butanediol diacrylate, neopentyl glycol diacrylate, 1,6-hexane diol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxy dimethacrylate, 1,1,1-trishydroxymethylethane diacrylate, 1,1,1-trishydroxymethylethane triacrylate, 1,1,1-trishydroxymethylethane dimethacrylate, 1,1,1-trishydroxymethylethane trimethacrylate, 1,1,1-trishydroxymethylpropane diacrylate, 1,1,1-trishydroxymethylpropane triacrylate, 1,1,1-trishydroxymethylpropane dimethacrylate, 1,1,1-trishydroxymethylpropane trimethacrylate, etc.; polymerizable unsaturated alcohol esters of polybasic acid such as triallyl cyanurate, triallyl isocyanurate, triallyl trimeritate, diallyl terephthalate, diallyl phthalate, etc.; and aromatic compounds having two or more vinyl substituents such as divinylbenzene can be given.

A combination of functional groups, which exist in the above-mentioned monomer, having two kinds of ethylenic unsaturated group respectively bearing groups capable of reacting with each other, and react with each other, is not particularly limited and, for example, a combination of an epoxy group and a carboxyl group, an amine group and a carboxyl group, an epoxy group and a carboxylic acid anhydride group, an amine group and a carboxylic acid chloride group, an alkylene imine group and a carbonyl group, an organoalkoxysilane group and a carboxyl group, and a hydroxyl group and an isocyanate glycidyl acrylate group can be given. Among them, the combination of an epoxy group and a carboxyl group is more preferable.

As the monomer having two kinds of ethylenic unsaturated group in the above-mentioned combination of an epoxy group and a carboxyl group, there can be given combinations of epoxy group-containing ethylenic unsaturated monomers such as glycidyl methacrylate, etc. and carboxyl group-containing ethylenic unsaturated monomers such as acrylic acid, methacrylic acid, crotonic acid, etc.

The above-mentioned internally crosslinked fine resin particle (C) preferably bears a cationic group such as an amino group, a quaternary ammonium or the like in order to remain a stable dispersion state in an emulsion. To realize this, there is a method of adding a monomer having an ethylenic unsaturated bond and a basic group, for example dimethylaminoethyl(meth)acylate, vinylpyridine, etc., to a monomer-mixture in synthesizing the internally crosslinked fine resin particle, or a method of polymerizing a monomer-mixture by using an initiator giving a cationic end such as 2,2'-azobis(2-methylpropionamidine)di-hydrochloride (trade mark: V-50, produced by Wako Pure Chemical Industries) in synthesizing the internally crosslinked fine resin particle.

When polymer, composing the above-mentioned internally crosslinked fine resin particle (C), has low polarity, the internally crosslinked fine resin particle is stably dispersed to form emulsion by using an appropriate emulsifier, particularly oligo soap, poly soap or a reactive emulsifier, having a dipolar ion group, in synthesizing the internally crosslinked fine resin particle (C), and this emulsion can also be used in producing the oil-in-water type emulsion containing the internally crosslinked fine resin particle of the present invention. The above-mentioned emulsifier having a dipolar ion group is disclosed in Japanese Kokai Publication Sho-56-24461, 57-21927, and 57-50522.

And, as the above-mentioned emulsifier, a cationic resin emulsifier can also be used. The above-mentioned cationic resin emulsifier is an emulsifier comprising of a cationic resin capable of emulsifying the above-mentioned internally crosslinked fine resin particle (C), and for example, an epoxy resin (A-1) having the above-mentioned cationic group can be used.

The above-mentioned internally crosslinked fine resin particle, comprising of resin having a crosslinking structure based on an ethylenic unsaturated monomer, can also be obtained by milling the polymer obtained through solution polymerization or bulk polymerization of the above-mentioned monofunctional ethylenic unsaturated monomer and a crosslinkable monomer and classifying the milled particle into a particle of 0.01 to 0.2 μm.

The above-mentioned fine resin particle comprising of a urethane resin internally crosslinked is a fine resin particle comprising of a polyurethane polymer obtained by reacting a polyisocyanate component with diol having a hydroxyl group at an end and diol having a carboxyl group or an active hydrogen-containing component having triol to form an isocyanate end group-containing polyurethane prepolymer, which has carbonate salt at a side chain, and subsequently reacting the formed polyurethane prepolymer with an active hydrogen-containing chain extention agent.

As a polyisocyanate component used for the above-mentioned prepolymer, there can be given aromatic diisocyanates such as diphenylmethane-4,4'-diisocyanate, trilene diisocyanate, xylylene diisocyanate; aliphatic diisocyanates such as hexamethylene diisocyanate, 2,2,4-trimethylhexane diisocyanate, etc.; and alicyclic diisocyanates such as 1-cyclohexane diisocyanate, 1-isocyanate-3-isocyanatemethyl-3,5-trimethylcyclohexane (isophorone diisocyanate), 4,4'-dicyclohexylmethane diisocyanate, methylcyclohexylene isocyanate, etc. The above-mentioned polyisocyanate component is more preferably hexamethylene diisocyanate or isophorone diisocyanate.

The above-mentioned diol having a hydroxyl group at an end thereof is not particularly limited and, for example, polyetherdiol, polyesterdiol or polycarbonate diol, which has a molecular weight of 100 to 5,000 can be given. The above-mentioned diol having a hydroxyl group at an end thereof is not particularly limited and, for example, polyethylene glycol, polypropylene glycol, polytetramethylene glycol, polybutylene adipate, polyhexamethylene adipate, polyneopentyl adipate, polycaprolactone diol, poly-3-methylvalerolactone diol and polyhexamethylene carbonate can be given The above-mentioned diol having a carboxyl group is not particularly limited and for example, dimethylolacetic acid, dimethylolpropionic acid, dimethylolbutyric acid, etc. can be given. Among them, dimethylolpropionic acid is preferable.

The above-mentioned triol is not particularly limited and for example, trimethylolpropane, trimethylolethane, glycerin polycaprolactone triol, etc. are given. By using triol, a urethane resin particle takes on a crosslinking structure internally.

The above-mentioned particle comprising of an internally crosslinked melamine resin is not particularly limited and for example, a particle of the internally crosslinked melamine resin obtained by dispersing a melamine resin and polyol in water in the presence of an emulsifier and then crosslinking the melamine resin with the polyol in a particle can be given.

The above-mentioned melamine resin is not particularly limited and, for example, the melamine resin described above can be used. The above-mentioned polyol is not particularly limited and for example, triol or tetrol, which has a molecular weight of 500 to 3,000, can be given. The above-mentioned polyol is more preferably polypropylene ether triol and polyethylene ether triol.

As the above-mentioned internally crosslinked fine resin particle (C), the internally crosslinked fine resin particle maybe isolated through filtering, spray drying, frozen drying, etc. and used as-is or milled into a proper particle size using a mill, etc. to be used in a condition of powder, or the obtained water dispersion may be used as-is or by substituting a solvent for the medium.

The above-mentioned internally crosslinked fine resin particle (C) have an average particle diameter ranging from 0.01 μm as a lower limit to 0.2 μm as an upper limit. When the average particle diameter is smaller than 0.01 μm, the particle is poor at handling and tend to flocculate because of their too small size. When it is larger than 0.2 μm, the dispersion of the particle becomes difficult because of coarse particle size. Also, the smoothness of a coating film is impaired. More preferably, the above-mentioned lower limit is 0.02 μm and the above-mentioned upper limit is 0.1 μm.

The above-mentioned oil-in-water type emulsion containing the internally crosslinked fine resin particle may further contain another hydrophobic resin (H-3) in addition to components of from the above-mentioned (A-1), (H-1) and/or (H-2) and (C). The above-mentioned another-hydrophobic resin (H-3) is preferably dissolved in an oil phase component in the above-mentioned emulsion particle.

The above-mentioned another hydrophobic resin (H-3) is not particularly limited and any hydrophobic resin such as a polyester resin, an epoxy resin, a polyurethane resin, an acrylic resin, a novolac resin, a resol resin and polyolefin resin may be used. Here, another hydrophobic resin (H-3) does not include the blocked isocyanate (H-1) and the above-mentioned melamine resin (H-2) of the above-mentioned hydrophobic resin (H). As such another hydrophobic resin (H-3), there can be more specifically given, for example, a flow agent and the like.

The above-mentioned flow agent is not particularly limited and, for example, a hydrophobic polyester resin can be given.

The above-mentioned hydrophobic polyester resin can be obtained by polyesterification of polyol and polycarboxylic acid or acid anhydride. The above-mentioned polyol is not particularly limited and, for example, tetraols such as a dimmer of pentaerythritol or trimethylol propane; triols such as trimethylol propane, hexane triol, etc.; and diols such as 1,9-nonanediol, 2-methyl-1,8-octanediol, neopentyl glycol, hydroxypivalic neopentyl glycol, 3-methyl-1,5-pentanediol, 1,5-pentanediol, 1,6-hexanediol, 1,4-butanediol, 2-methyl-1,3-propylene glycol, propylene glycol, hexylene glycol, ethylene glycol, diethylene glycol, hydrogenated bisphenol A, caprolactone diol, bishydroxyethyl taurine and reduced forms of dimer acids can be given.

And, particularly, the feature of the present invention is outstandingly exerted by using conjugated alkadiene diol having a polymerization degree of 5 to 50 alone, a hydrogenated substance of this diol alone or a mixture thereof as the above-mentioned polyol. These diols are derived from conjugated alkadiene oligomer or polymer, having a polymerization degree of 5 to 50. Their molecular weights preferably lie within a range of 1,000 to 4,000, particularly a range of 1,500 to 3,000. Specifically, for example, 1,4-polyisoprenediol, 1,4- and 1,2-polybutadienediol, and a hydrogenated substance of these diols are preferred. These are commercially available and EPOL (trade mark) (hydrogenated polyisoprenediol, molecular weight 1,860, average polymerization degree 26, produced by Idemitsu Petrochemical Co.,Ltd), PIP (trademark) (polyisoprenediol, molecular weight 2,200, average polymerization degree 34, produced by Idemitsu Petrochemical Co.,Ltd), Polytail HA (trade mark) (hydrogenated polybutadienediol, molecular weight 2,200, average polymerization degree 39, produced by MITSUBISHI CHEMICAL CORPORATION), Polytail H (trade mark) (hydrogenated polybutadienediol, molecular weight 2,350, average polymerization degree 42, produced by MITSUBISHI CHEMICAL CORPORATION), and R-45HT (trade mark) (polybutadienediol, molecular weight 2,270, average polymerization degree 42, produced by Idemitsu Petrochemical Co.,Ltd) can be examplined.

The above-mentioned polycarboxylic acid is not particularly limited and for example, isophthalic acid, terephthalic acid, tetrahydrophthalic acid, adipic acid, trimellitic acid, azelaic acid, sebacic acid, succinic acid, cyclohexanedicarboxylic acid, maleic acid, dimer acid, etc. can be given. The above-mentioned acid anhydride is not particularly limited and for example, the acid anhydride of the above-mentioned polycarboxylic acid can be given.

Preferably, the above-mentioned hydrophobic polyester resin has a number-average molecular weight ranging from 500 as a lower limit to 10,000 as an upper limit. When the number-average molecular weight thereof is less than 500, the hardness and water resistance of a coating film is deteriorated, and when it is more than 10,000, the smoothness of a coating film is deteriorated. The above-mentioned lower limit is more preferably 800, and furthermore preferably 1,000. The above-mentioned upper limit is more preferably 8,000, and furthermore preferably 6,000.

The above-mentioned hydrophobic polyester resin preferably has an acid value of less than 15 mgKOH/g. When the acid value is 15 mgKOH/g or more, the water resistance of a coating film is deteriorated. The acid value is more preferably less than 10 mgKOH/g and furthermore preferably less than 8 mgKOH/g.

The above-mentioned hydrophobic polyester resin can impart plasticity and flexibility to a coating film. Also, since it is a hydrophobic resin, it can improve the workability, particularly a popping property.

The oil-in-water type emulsion containing the fine resin particle of the present invention may contain any another component in addition to the above-mentioned components as required. As the above-mentioned any component, there can be given an organic solvent, a surfactant, a curing catalyst and the like.

In the oil-in-water type emulsion containing the fine resin particle of the present invention, the percentage contents of components of (A-1), (H-1) and/or (H-2), (C), and (H-3) can be appropriately set in response to an emulsion composition intended to be attained. When the obtained the oil-in-water type emulsion containing the fine resin particle is used in a cation electrodeposition coating composition, generally, it is preferred to use the internally crosslinked fine resin particle (C) in an amount of within the range from 1 weight percent as a lower limit to 100 weight percent as an upper limit with respect to the epoxy resin (A-1). When the amount of the internally crosslinked fine resin particle (C) is less than 1 weight percent, there maybe cases where the effect of controlling the viscosity of a coating film is not exerted sufficiently. Further, when it is more than 100 weight percent, a problem that this lead to appearance deficiencies of a coating film may arise.

The total percentage content of the above-mentioned blocked isocyanate (H-1) and/or the melamine resin (H-2) preferably lies within the range of 10 weight percent as a lower limit to 50 weight percent as an upper limit with respect to the epoxy resin (A-1). When the total percentage content is less than 10 weight percent, there is a possibility of leading to insufficient curing. When it is more than 50 weight percent, there is a possibility of leading to deterioration of physical properties such as brittleness of a cured coating film.

And, when another hydrophobic resin (H-3) is used in a cation electrodeposition coating composition, generally, it is preferred to use another hydrophobic resin (H-3) in an amount of within the range from 1 weight percent as a lower limit to 50 weight percent as an upper limit with respect to the epoxy resin (A-1). When the amount of another hydrophobic resin (H-3) is less than 1 weight percent, there maybe cases where the effect resulting from blending another hydrophobic resin (H-3) is not exerted sufficiently. Further, when it is more than 50 weight percent, a problem of leading to decrease in performances of strength and a rust-preventive property may arise.

In the first method of producing the oil-in-water type emulsion containing the internally crosslinked fine resin particle of the present invention (the second present invention), first, a water-in-oil type emulsion (Y), composed of components of the above-mentioned (A-1), (H-1) and/or (H-2), (C), and (H-3) used as required, is produced. The above-mentioned water-in-oil type emulsion (Y) is one expressed by a schematic diagram shown in FIG. 3. A method of producing the above-mentioned water-in-oil type emulsion (Y) is not particularly limited and for example, a method shown in FIG. 8 and a method shown in FIG. 9 can be given.

The method shown in FIG. 8 is a method comprising of a step (1-1) of neutralizing an epoxy resin (A-1) by mixing the epoxy resin (A-1), and the blocked isocyanate (H-1) and/or the melamine resin (H-2) with the acid neutralizing 20 to 150 mole percent of the cationic group in the above-mentioned epoxy resin (A-1), and a step (1-2) of mixing the neutralized epoxy resin (A-1) obtained through the above-mentioned step (1-1), and the blocked isocyanate (H-1) and/or the melamine resin (H-2) with water dispersion (W) of an internally crosslinked fine resin particle (C) to form the water-in-oil type emulsion (Y).

In the above-mentioned method, by adding first an acid to a mixture of the epoxy resin (A-1) and the blocked isocyanate (H-1) and/or the melamine resin (H-2) by a usual method, the cationic group of the epoxy resin (A-1) is neutralized [step (1-1)]. In performing the above-mentioned step (1-1), the water-in-oil type emulsion maybe formed by using a small amount of aqueous medium.

When the objective oil-in-water type emulsion containing the internally crosslinked fine resin particle contains another hydrophobic resin (H-3), it is preferred to mix another hydrophobic resin (H-3) in the above-mentioned step (1-1). Mixing another hydrophobic resin (H-3) in the above-mentioned step (1-1) causes another hydrophobic resin (H-3) to exist in an oil phase.

Then, the water-in-oil type emulsion (Y) is prepared by mixing the water dispersion (W) of the internally crosslinked fine resin particle (C) into the neutralized epoxy resin (A-1) obtained through the above-mentioned step (1-1), and the blocked isocyanate (H-1) and/or the melamine resin (H-2).

The method shown in FIG. 9 is a method comprising of a step (2-1) of mixing the water dispersion (W) of the internally crosslinked fine resin particle (C) having an average particle diameter of 0.01 to 0.2 μm with an acid neutralizing 20 to 150 mole percent of a cationic group in the epoxy resin (A-1) to form dispersion (V), and a step (2-2) of mixing the dispersion (V) obtained through the above-mentioned step (2-1) with the above-mentioned epoxy resin (A-1), and the above-mentioned blocked isocyanate (H-1) and/or the above-mentioned melamine resin (H-2) to form the water-in-oil type emulsion (Y).

In the above-mentioned step (2-1), the dispersion (V) is formed by adding a predetermined amount of acid to the above-mentioned water dispersion (W) of the internally crosslinked fine resin particle (C).

Then, the water-in-oil type emulsion (Y) is prepared by mixing the above-mentioned dispersion (V) with the above-mentioned epoxy resin (A-1), and the above-mentioned blocked isocyanate (H-1) and/or the above-mentioned melamine resin (H-2) [step (2-2)]. Through the above-mentioned step, an oil phase containing the above-mentioned epoxy resin (A-1) and above-mentioned blocked isocyanate (H-1) and/or the above-mentioned melamine resin (H-2) becomes a dispersion medium, and water in the dispersion (V) and components dissolved in this water become the emulsion particle. In this time, the internally crosslinked fine resin particle (C) are not dispersed in an emulsion particle comprising of an aqueous medium but dispersed in the oil phase comprising of the epoxy resin (A-1) and the blocked isocyanate (H-1) and/or the melamine resin (H-2).

When the objective oil-in-water type emulsion containing the internally crosslinked fine resin particle contains another hydrophobic resin (H-3), it is preferred to mix another hydrophobic resin (H-3) in the above-mentioned step (2-2). Mixing another hydrophobic resin (H-3) in the above-mentioned step (2-2) causes another hydrophobic resin (H-3) to exist in an oil phase.

The oil-in-water type emulsion containing the internally crosslinked fine resin particle of the present invention (the second present invention) can be obtained by adding an aqueous medium to the water-in-oil type emulsion (Y) obtained by the above-mentioned method to undergo phase transition to the oil-in-water type (the first method). The first method is schematically illustrated in FIG. 4. The aqueous medium to be used is based on water and may contain a hydrophilic organic solvent such as alcohol, cellosolve, etc. as required.

In undergoing phase transition from the water-in-oil type emulsion (Y) by adding the above-mentioned aqueous medium, it is preferred to add the aqueous medium in an amount of within the range from 40 weight percent as a lower limit to 500 weight percent as an upper limit with respect to 100 weight parts of the above-mentioned water-in-oil type emulsion (Y) (total amount of emulsion). When the amount of the aqueous medium is less than 40 weight percent, it is not preferred since there may be cases where the phase transition does not occur. When it is more than 500 weight percent, the concentration of solid matter of resin in the emulsion decreases too much and therefore it is not preferred from the viewpoint of a production efficiency. Addition of the above-mentioned aqueous medium is preferably performed according to a method of adding the aqueous medium gradually while stirring the water-in-oil type emulsion (Y).

The second method of producing the above-mentioned oil-in-water type emulsion containing the internally crosslinked fine resin particle of the present invention (the second invention) is schematically shown in FIG. 5. The above-mentioned second method is a method in which an oily dispersion (X) is prepared by mixing the components of the above-mentioned (A-1), (H-1), (H-2) and (C), and (H-3) used as required and the objective oil-in-water type emulsion containing the fine resin particle is produced by adding an aqueous medium to the above-mentioned oily dispersion (X) and emulsifying the mixture.

The first method described above can be favorably used when the internally crosslinked fine resin particle (C) to be used forms aqueous dispersion, and the second method described above can be favorably used when the internally crosslinked fine resin particle (C) to be used forms oily dispersion. And, when the internally crosslinked fine resin particle (C) is powder, the second methods will be used.

With respect to the oil-in-water type emulsion containing the internally crosslinked fine resin particle, produced by the above-mentioned methods, it was verified by measuring a particle size distribution that it has a structure shown in FIG. 1. That is, in the case of the oil-in-water type emulsion containing the internally crosslinked fine resin particle having form shown in FIG. 2, when the particle size distribution is measured, two peaks, namely a peak resulting from the internally crosslinked fine resin particle (C) and a peak resulting from the resin emulsion particle, appear. However, the oil-in-water type emulsion containing the internally crosslinked fine resin particle of the present invention exhibits only single peak in measuring the particle size distribution. From this point, it is apparent that the oil-in-water type emulsion containing the internally crosslinked fine resin particle of the present invention has a structure illustrated in FIG. 1.

In measuring the above-mentioned particle size distribution, the oil-in-water type emulsion containing the internally crosslinked fine resin particle of the present invention preferably have an average particle diameter, obtained from the particle size distribution, ranging from 0.02 µm as a lower limit to 0.3 µm as an upper limit.

The cation electrodeposition coating composition of the present invention (the third present invention) comprises of at least the above-mentioned oil-in-water type emulsion containing the internally crosslinked fine resin particle, and pigment dispersion paste. When pigment is used as a component of the cation electrodeposition coating composition, generally, pigment is previously dispersed in an aqueous medium in high concentration and made in paste form. The reason for this is that it is difficult to disperse the pigment so as to be low in concentration and homogeneous as used in the cation electrodeposition coating composition in a single step since pigment is of powder form. In this specification, such a paste is referred to as pigment dispersion paste.

The above-mentioned pigment dispersion paste comprises of pigment and a dispersant of pigment. The above-mentioned pigment is not particularly limited and for example, coloring pigment such as white titanium, carbon black, red iron oxide, etc.; extender pigment such as kaoline, talc, aluminum silicate, calcium carbonate, mica, clay and silica; rust-preventive pigment such as zinc phosphate, iron phosphate, aluminum phosphate, calcium phosphate, zinc phosphite, zinc cyanide, zinc oxide, aluminum tripolyphosphate, zinc molybdate, aluminum molybdate, calcium molybdate and phosphorus aluminum molybdate can be given.

The above-mentioned pigment dispersion resin is not particularly limited and for example, cationic or nonionic surfactants with low molecular weight and cationic polymers such as modified epoxy resins having a quaternary ammonium group and/or a tertiary sulfonium group can be given After these components are mixed, the mixture is dispersed until the pigment becomes a prescribed and uniform particle size to obtain the pigment dispersion paste. A disperser is generally used for dispersion. For example, a ball mill or a sand grinding mill are used. The particle diameter of the pigment contained the pigment dispersion paste is preferably 10 µm or smaller.

In the case where the above-mentioned pigment dispersion paste is blended in the cation electrodeposition coating composition, when in the above-mentioned cation electrodeposition coating composition, the weight of total pigments is expressed by P, the weight of total vehicle components is expressed by V, and a ratio of the weight of total pigments to the weight of total vehicle components is expressed by P/V, it is preferred that P/V lies within a range of $1/10$ to $1/2$. Here, total vehicle components other than pigment refer to total components of solid matter (main resin components not dissolved with each another, respective curing agents and pigment dispersion resins, etc.) composing coating material other than pigment. When the above-mentioned P/V is less than $1/10$, the interception of corrosion factors such the rays and moisture to a coating film is extremely deteriorated due to an insufficient amount of pigment and weather resistance and corrosion resistance at a practical level may not be exhibited. And, when P/V is more than $1/2$, an excessive amount of pigment leads to an increase in viscosity in curing and deterioration of a flow property, and therefore the coating film appearance may be deteriorated.

The cation electrodeposition coating composition of the present invention may contain a resin emulsion not containing the internally crosslinked fine resin particle (C) as required. Further, in addition to the above-mentioned components, components usually contained in cation electrodeposition coating compositions may be added in an amount of being usually used to the cation electrodeposition coating composition of the present invention as required. As the above-mentioned components, there can be given, for example, a viscosity adjustor, a surfactant, an antioxidant and an ultraviolet absorber.

Cation electrodeposition using the cation electrodeposition coating composition of the present invention is conducted in conditions conventionally used commonly, that is, a coating bath temperature of 20 to 40° C., an applied voltage of 50 to 500 V and a current-carrying time of 30 seconds to 10 minutes depending on a state of a substance to be coated to be fully immersed in a coating bath. Thickness of the obtained cation electrodeposition coating film preferably lies within a range of 5 µm as a lower limit to 50 µm as an upper limit in terms of baked coating film. Preferably, the above-mentioned lower limit is 10 µm and the above-mentioned upper limit is 35 µm.

Baking of the cation electrodeposition coating film in the present invention is preferably performed within a range of 100° C. as a lower limit to 200° C. as an upper limit in terms of the temperature of the substance to be coated. Preferably, the above-mentioned lower limit is 110° C. and the above-mentioned upper limit is 180° C. A baking time is usually 5 to 50 minutes. A metal material to which the cation electrodeposition coating composition of the present invention is applicable is not particularly limited and for example, iron, copper, zinc plating material, aluminum and alloys thereof can be given. And a substance subjected to chemical conversion treatment prior to coating by the cation electrodeposition coating composition may be used.

A coated substance of the present invention (the fourth present invention) is obtained by coating the above-mentioned cation electrodeposition coating composition by the above-mentioned method and has excellent properties in a rust-preventive property at an edge portion, smoothness and oil repellency of a coating film.

In accordance with the first present invention, it is possible to efficiently produce an emulsion in which the internally crosslinked fine resin particle (C) is dispersed in an oil phase of the oil-in-water type emulsion. The oil-in-water type emulsion obtained by the method of the present invention can provide an excellent coating composition which can control its fluidity in a not-yet-cured coating film since the internally crosslinked fine resin particle (C) is dispersed in an emulsion particle.

Because the oil-in-water type emulsion containing the internally crosslinked fine resin particle of the second present invention comprises of an epoxy resin (A-1) having a cationic group, a blocked isocyanate (H-1) and/or a melamine resin (H-2), and an internally crosslinked fine resin particle (C) having an particle diameter of 0.01 to 0.2 µm and the above-mentioned internally crosslinked fine resin particle (C) is dispersed in an oil phase, the above-mentioned oil-in-water type emulsion containing the internally crosslinked fine resin particle can control its fluidity in curing the coating film, formed by electrodeposition coating, through heating especially when it is used as a cation electrodeposition coating composition. Thereby, it is possible to form a coating film having an excellent edge-covering property and an excellent rust-preventive property of an edge portion. And, it is possible to obtain a cation electrodeposition coating composition which has excellent smoothness of a coating film, can suppress oil repellency and is superior in the stability of bath, electrodeposition properties, the water resistance of a coating film, etc.

BEST MODE FOR CARRYING OUT THE INVENTION

Hereinafter, the present invention will be described more in detail by way of examples, but the present invention is not limited to these examples. And, in Examples, "part" refers to "part by weight" unless otherwise specified.

EXAMPLES

Preparative Examples 1

Preparation of Resin 1 Having a Cationic Group

In a reaction vessel equipped with a stirrer, a cooling tube, a nitrogen gas inlet pipe, a thermometer and a dropping funnel, 21.8 parts of 2,4-trilene diisocyanate/2,6-trilene diisocyanate (weight ratio=8/2), 88.7 parts of methyl isobutyl ketone (hereinafter, referred to as MIBK) and 0.01 part of dibutyltin dilaurate were put. 24.4 parts of methanol was added to this mixture at room temperature and as a result a system temperature rose to 60° C. due to an exothermic reaction. Subsequently, a reaction was continued for 30 minutes, and then 132.3 parts of 4,4'-diphenylmethane diisocyanate and 29.1 parts of ethylene glycol mono-2-ethylhexyl ether was dropwised over 1 hour. To this reaction mixture, 82.0 parts of propylene oxide 5 mole adduct of bisphenol A was further added. A reaction was conducted mostly in the range 60 to 65° C. and continued till the disappearance of an isocyanate group while measuring infrared spectrums.

Next, 940.0 parts of epoxy resin having an epoxy equivalent of 188, which was synthesized from bisphenol A and epichlorohydrin, was added to the reactant, and the mixture was heated to 125° C. Then, 2.03 parts of benzyldimethylamine was further added and the mixture was reacted at 130° C. until reaching an epoxy equivalent of 284 while distilling off methanol generated as a by-product by using a decanter. Subsequently, 262.0 parts of bisphenol A and 76.9 parts of 2-ethylhexanoic acid were added and the mixture was reacted at 130° C. As a result, the epoxy equivalent became 1,070. After this, the reaction mixture was cooled, and 27.7 parts of dibutylamine, 65.3 parts of N-methylethanolamine and 93.6 parts of ketimide of aminoethylethanolamine (79 weight percent MIBK solution) were added and the resulting mixture was reacted at 110° C. for 2 hours. Then, the reactant was diluted with MIBK until a non-volatile content became 86% to obtain an aminated epoxy resin 1 containing an oxazolidone ring. The amine value of the resulting resin 1 was 107 mgKOH/g and its number-average molecular weight was 2,400.

Preparative Examples 2

Preparation of Resin 2 Having a Cationic Group

In a reaction vessel equipped with a stirrer, a cooling tube, a nitrogen gas inlet pipe, a thermometer and a dropping funnel, 43.6 parts of 2,4-trilene diisocyanate/2,6-trilene diisocyanate (weight ratio=8/2), 22.5 parts of methyl isobutyl ketone (hereinafter, referred to as MIBK) and 0.07 parts of dibutyltin dilaurate were put. 19.3 parts of methanol was added to this mixture at room temperature and as a result a system temperature rose to 60° C. due to an exothermic reaction. A reaction was conducted mostly in the range 60 to 65° C. and continued till the disappearance of an isocyanate group while measuring infrared spectrums.

Next, 515.1 parts of epoxy resin having an epoxy equivalent of 188, which was synthesized from bisphenol A and epichlorohydrin, was added to the reactant, and the mixture was heated to 125° C. Then, 0.68 parts of benzyldimethylamine was further added and the mixture was reacted at 130° C. until reaching an epoxy equivalent of 249 while distilling off methanol generated as a by-product by using a decanter. Subsequently, 141.4 parts of bisphenol A and 57.6 parts of 2-ethylhexanoic acid were added and the mixture was reacted at 130° C. As a result, the epoxy equivalent became 1,260. After this, the reaction mixture was cooled, and 34.3 parts of N-methylethanolamine and 41.0 parts of ketimide of aminoethylethanolamine (79 weight percent MIBK solution) were added and the resulting mixture was reacted at 110° C. for 2 hours. Then, the reactant was diluted with MIBK until a non-volatile content became 80% to obtain an aminated epoxy resin 2 containing an oxazolidone ring. The amine value of the resulting resin 2 was 94 mgKOH/g and its number-average molecular weight was 1,800.

Preparative Examples 3

Preparation of Internally Crosslinked Fine Resin Particle 1

In a reaction vessel equipped with a stirrer, a cooling tube, a nitrogen gas inlet pipe, a thermometer and a dropping funnel, 3.6 parts of the aminated epoxy resin 2, prepared in Preparative Examples 2, having an oxazolidone ring, 0.25 parts of glacial acetic acid and 159.1 parts of ion-exchanged water were put, and the contents in the vessel was heated and stirred at 75° C. To this resin mixture, an aqueous solution of 0.6 parts of 2,2'-azobis(2-(2-imidazoline-2-yl)propane))

neutralized wholly with acetic acid was dropwised over 5 minute. The mixed solution was aged for 5 minutes and then 10 parts of methyl methacylate was dropwised over 5 minute. The mixture was further aged for 5 minutes and to the aged mixture, preemulsion, which was obtained by adding a α,β-ethylenic unsaturated monomer mixture comprising of 55.0 parts of t-butyl methacrylate, 5.0 parts of 4-hydroxybutyl acrylate and 30.0 parts of neopentyl glycol diacrylate to a mixed solution of 10.7 parts of the above-mentioned epoxy resin, 0.75 parts of glacial acetic acid and 75.0 parts of ion-exchanged water and by stirring, was dropwised over 40 minutes. This mixture was aged for 60 minutes and then cooled to obtain a dispersion of internally crosslinked fine resin particle 1. The non-volatile content of the resulting dispersion of crosslinked resin particle 1 was 30%, its pH was 4.7 and its average particle diameter was 40 nm.

Preparative Examples 3-2

Preparation of Internally Crosslinked Fine Resin Particle 2 Dispersed in a Solvent The dispersion of the crosslinked resin particle obtained in Preparative Examples 3 was mixed with xylene to form a mixture and water was removed azeotropically from the mixture under a reduced pressure using an evaporator and the internally crosslinked fine resin particle 2 dispersed in xylene was obtained. The non-volatile content of the resulting xylene dispersion of the internally crosslinked fine resin particle 2 was 30% and its average particle diameter was 40 nm.

Preparative Examples 4

Preparation of Pigment Dispersion Paste 1

222.0 parts of isophorone diisocyanate was put in a reaction vessel equipped with a stirrer, a cooling tube, a nitrogen gas inlet pipe, a thermometer and a dropping funnel and diluted with 39.1 parts of methyl isobutyl ketone, and then to this solution, 0.2 part of dibutyltin dilaurate was added. A reaction temperature was raised to 50° C. and 131.5 parts of 2-ethylhexyl alcohol was dropwised over 2 hours. The mixture was appropriately cooled and by maintaining a reaction temperature at 50° C., half-blocked isocyanate having a solid content of 90% was obtained.

Then, 351.6 parts of EPON 828 (epoxy resin produced by Shell Chemicals Japan Ltd., epoxy equivalent 190) and 99.2 parts of bisphenol A were charged into another reaction vessel and heated to 130° C. in an atmosphere of nitrogen. To this, 1.41 parts of benzyldimethylamine was added and reacted at 170° C. for about 1 hour to obtain bisphenol A type epoxy resin having an epoxy equivalent of 450. The reaction solution was cooled to 140° C., and 218.3 parts of half-blocked isocyanate, prepared previously, was added to the reaction solution and maintained at 140° C. for 1 hour.

172.3 parts of dipropyleneglycol monobutyl ether was added to this mixture, and after dilution, the reaction solution was cooled 100° C., and 408.0 parts (solid content 136.0 parts) of SHP-100 (1-(2-hydroxyethylthio)-2-propanol, produced by Sanyo Kasei Kogyo Co., Ltd.), 134.0 parts of dimethylolpropionic acid and 144.0 parts of ion-exchanged water were added to the reaction solution to be reacted at 70 to 75° C. until an acid value became 3.0 or smaller. A sulfonium group-modified epoxy resin having tertiary sulfonated ratio of 70.6% was obtained through this reaction.

This resin was diluted with 324.8 parts of dipropyleneglycol monobutyl ether and 1204.8 parts of ion-exchanged water to obtain sulfonium group-containing resin for pigment dispersion, having the resin solid content of 30%.

180.0 parts of the sulfonium group-containing resin for pigment dispersion thus obtained, 9 parts of MA-100 (carbon black, produced by MITSUBISHI CHEMICAL CORPORATION), 76 parts of barium sulfate 8-30 (produced by Sakai Chemical Industry Co., Ltd.), 15 parts of KF BOUSEI PM-303W (phosphorus-aluminum molybdate-zinc inorganic pigment, produced by KIKUCHI COLOR & CHEMICALS CORPORATION), 8 parts of dibutyltin oxide and 36 parts of ion-exchanged water were mixed and milled up to a particle size of 10 μm or smaller with a sand grinding mill to prepare pigment dispersion paste 1.

Preparative Examples 5

Preparation of Blocked Isocyanate Curing Agent 1

In a reaction vessel equipped with a stirrer, a cooling tube, a nitrogen gas inlet pipe, a thermometer and a dropping funnel, 134.0 parts of 4,4'-diphenylmethane diisocyanate, 27.7 parts of MIBK and 0.2 parts of dibutyltin dilaurate were put and heated to 80° C. After the contents in the vessel was dissolved homogeneously, a solution, formed by dissolving 22.6 parts of ε-caprolactam in 94.4 parts of ethylene glycol monobutyl ether, was dropwised into the above-mentioned reaction vessel at 80° C. over 2 hours. A reaction temperature was raised to 100° C., and the contents in the vessel was heated for 4 hours and reacted till the disappearance of an isocyanate group while using infrared spectrum analysis. Then, 34.9 parts of methyl isobutyl ketone was added to the reactant to obtain a blocked isocyanate curing agent 1.

Preparative Examples 6

Preparation of Acrylic Resin 1 Having an Amino Group

In a reaction vessel equipped with a stirrer, a cooling tube, a nitrogen gas inlet pipe, a thermometer and a dropping funnel, 56.7 parts of MIBK was put and heated to 115° C. and stirred. To this MIBK, a mixed solution of 5.3 parts of tert-butylperoxy-2-ethylhexanoate and 2.4 parts of MIBK, and a monomer mixture comprising of 16.0 parts of glycidyl methacrylate, 22.6 parts of styrene, 17.5 parts of 2-hydroxyethyl methacrylate, 18.6 parts of methyl methacrylate and 25.3 parts of n-butyl acrylate were dropwised over 3 hours. This mixture was aged for 30 minutes and then a mixed solution of 5.0 parts of tert-butylperoxy-2-ethylhexanoate and 5.0 parts of MIBK was dropwised over 30 minutes. The resulting mixture was further aged for 2 hours and then reacted with 8.5 parts of N-methylethanolamine to obtain acrylic resin 1 having an amino group. The amine value of the acrylic resin 1 having this amino group was 70 mgKOH/g and its number-average molecular weight was 4,000.

Preparative Examples 7

Preparation of Internally Crosslinked Fine Resin Particle 3

In a reaction vessel equipped with a stirrer, a cooling tube, a nitrogen gas inlet pipe, a thermometer and a dropping funnel, 3.6 parts of the acrylic resin 1 having a amino group, prepared in Preparative Examples 6, 0.72 part of glacial acetic acid and 159.1 parts of ion-exchanged water were put, and the contents in the vessel was heated and stirred at 75° C. To this resin mixture, an aqueous solution of 0.5 parts of 2,2'-azobis(2-(2-imidazoline-2-yl)propane)) neutralized wholly with acetic acid was dropwised over 5 minute. The mixed solution was aged for 5 minutes and then 10 parts of methyl methacylate was dropwised over 5 minute. The mixture was further aged for 5 minutes and to the aged mixture, preemulsion, which was obtained by adding a α,β-ethylenic unsaturated monomer mixture comprising of 55.0 parts of t-butyl methacrylate, 5.0 parts of 4-hydroxybutyl acrylate and 30.0 parts of neopentyl glycol dimethacrylate to a mixed solution of 10.7 parts of the above-mentioned acrylic resin, 2.16 parts of glacial acetic acid and 75.0 parts of ion-exchanged water and by stirring, was dropwised over 40 minutes. This mixture was aged for 60 minutes and then cooled to obtain a dispersion of internally crosslinked fine resin particle 3. The non-volatile content of the resulting dispersion of crosslinked resin particle 3 was 30%, its pH was 4.3 and its average particle diameter was 60 nm.

Preparative Examples 8

Preparation of Acrylic Resin 1 Having a Carboxyl Group

In a reaction vessel equipped with a stirrer, a cooling tube, a nitrogen gas inlet pipe, a thermometer and a dropping funnel, 30.0 parts of MIBK was put and heated to 115° C. and stirred. To this MIBK, a mixed solution of 10.0 parts of tert-butylperoxy-2-ethylhexanoate and 1.5 parts of MIBK, and a monomer mixture, which has a solubility parameter (SP) value of 10.7, comprising of 3.8 parts of methacrylic acid, 2.6 parts of styrene, 25.5 parts of 2-hydroxyethyl methacrylate, 21.5 parts of 2-ethylhexyl acrylate and 46.5 parts of n-butyl acrylate were dropwised over 3 hours. This mixture was aged for 30 minutes and then a mixed solution of 0.3 part of tert-butylperoxy-2-ethylhexanoate and 1.0 parts of MIBK was dropwised over 30 minutes. The resulting mixture was further aged for 2 hours to obtain acrylic resin 1 having a carboxyl group. The number-average and the weight-average molecular weights, measured by gel permeation chromatography (GPC) and converted to polystyrene, of the acrylic resin 1 having this carboxyl group were 4,900 and 12,000, respectively, and the acid value was 27.0 mgKOH/g.

Preparative Examples 9

Preparation of Internally Crosslinked Fine Resin Particle 4

In a reaction vessel equipped with a stirrer, a cooling tube, a nitrogen gas inlet pipe, a thermometer and a dropping funnel, 3.6 parts of the acrylic resin 1 having a carboxyl group, prepared in Preparative Examples 8, 0.11 part of N,N'-dimethylethanolamine (hereinafter, refer to as DMEA) and 159.1 parts of ion-exchanged water were put, and the contents in the vessel was heated and stirred at 75° C. To this resin mixture, a mixture of 0.5 parts of 4,4'-azobis(4-cyanovaleric acid), 0.31 part of DMEA and 20 parts of ion-exchanged water was dropwised over 5 minute. The mixed solution was aged for 5 minutes and then 10 parts of methyl methacylate was dropwised over 5 minute. The mixture was further aged for 5 minutes and to the aged mixture, preemulsion, which was obtained by adding a α,β-ethylenic unsaturated monomer mixture comprising of 55.0 parts of t-butyl methacrylate, 5.0 parts of 4-hydroxybutyl acrylate and 30.0 parts of neopentyl glycol dimethacrylate to a mixed solution of 10.7 parts of the above-mentioned acrylic resin, 0.33 part of DMEA and 75.0 parts of ion-exchanged water and by stirring, was dropwised over 40 minutes. This mixture was aged for 60 minutes and then cooled to obtain a dispersion of internally crosslinked fine resin particle 4. The non-volatile content of the resulting dispersion of crosslinked resin particle 4 was 30%, its pH was 8.5 and its average particle diameter was 60 nm.

Preparative Examples 10

Preparation of Pigment Dispersion Paste 2

18.1 parts of the acrylic resin 1 having a carboxyl group, prepared in Preparative Examples 8, 1.1 parts of N,N'-dimethylethanolamine, 47.8 parts of ion-exchanged water and 40.0 parts of TIPAQUE titanium oxide (produced by ISHIHARA SANGYO KAISHA, LTD.) were mixed and milled up to a particle size of 5 μm or smaller with a sand grinding mill to prepare pigment dispersion paste 2.

Example 1

Preparation of Oil-in-Water Type Emulsion 1 Containing Fine Resin Particles

The aminated epoxy resin 1 containing an oxazolidone ring, which is obtained in Preparative Example 1 and the blocked isocyanate curing agent 1 prepared in Preparative Examples 5 were homogeneously mixed in a blending ratio as solid matter of 75:25, and then ethylene glycol monohexyl ether was added in an amount of being 8.8% with respect to the total solid content. Further, aqueous acetic acid was added and stirred in such a way that a neutralization ratio is 35.5% to form a water-in-oil type emulsion. To this mixture, the crosslinked resin particle 1 prepared in Preparative Example 3 was added in an amount of being 10% with respect to the total solid content of this mixture. Then, the mixture was gradually diluted by adding ion-exchanged water and was undergone phase transition to an oil-in-water type emulsion. An emulsion 1 containing fine resin particles was obtained by removing MIBK under a reduced pressure in such a way that the solid content is 36.0%. The non-volatile content of the resulting emulsion 1 containing fine resin particles was 38.1%, its pH was 6.3 and its average particle diameter was 85 nm. As described above, only single peak was exhibited in measuring a particle size distribution. The particle size distribution measured was shown in FIG. 10.

Example 2

Preparation of Oil-in-Water Type Emulsion 2 Containing Fine Resin Particles

The aminated epoxy resin 1 containing an oxazolidone ring, which is obtained in Preparative Example 1 and the blocked isocyanate curing agent 1 obtained in Preparative Examples 5 were homogeneously mixed in a blending ratio as solid matter of 75:25, and then ethylene glycol monohexyl ether was added in an amount of being 8.8% with respect to the total solid content. And, aside from this, aqueous acetic acid in an amount such that a neutralization ratio is 35.5% and the crosslinked fine resin particle 1 in an amount corresponding to 10% of the total resin solid content were mixed in another aminated epoxy resin. After this mixture was diluted with ion-exchanged water, to the diluted mixture, the resin mixture described above was added to form a water-in-oil type emulsion. This water-in-oil type emulsion mixture was diluted by further adding ion-exchanged water gradually and the emulsion was undergone phase transition to an oil-in-water type emulsion. An emulsion 2 containing fine resin particles was obtained by removing MIBK under a reduced pressure in such a way that the solid content is 36.0%. The non-volatile content of the resulting emulsion 2 containing fine resin particles was 36.1%, its pH was 6.3 and its average particle diameter was 85 nm. As described above, only single peak was exhibited in measuring a particle size distribution. The particle size distribution measured was shown in FIG. 11.

Example 3

Preparation of Oil-in-Water Type Emulsion 3 Containing Fine Resin Particles

The aminated epoxy resin 1 containing an oxazolidone ring, which is obtained in Preparative Example 1 and the blocked isocyanate curing agent 1 prepared in Preparative Examples 5 were homogeneously mixed in a blending ratio as solid matter of 75:25, and then ethylene glycol monohexyl ether in an amount of being 8.8% with respect to the total solid content and aqueous acetic acid in an amount such that a neutralization ratio is 35.5% were added. And, to the crosslinked fine resin particle 2, obtained in Preparative Examples 3-2, in an amount corresponding to 10% of the total resin solid content, the resin mixture described above were added gradually while stirring to form a water-in-oil type emulsion. This water-in-oil type emulsion mixture was diluted by adding ion-exchanged water gradually and the emulsion was undergone phase transition to an oil-in-water type emulsion. An emulsion 3 containing fine resin particles was obtained by removing MIBK under a reduced pressure in such a way that the solid content is 36.0%. The non-volatile content of the resulting emulsion 3 containing fine resin particles was 36.1%, its pH was 6.3 and its average particle diameter was 85 nm. As described above, only single peak was exhibited in measuring a particle size distribution. The particle size distribution measured was shown in FIG. 12.

Example 4

Preparation of Oil-in-Water Type Emulsion 4 Containing Fine Resin Particles

The acrylic resin 1 having an amino group, which is obtained in Preparative Example 6 and the blocked isocyanate curing agent 1 prepared in Preparative Examples 5 were homogeneously mixed in a blending ratio as solid matter of 75:25, and then ethylene glycol monohexyl ether was added in an amount of being 3.0% with respect to the total solid content. Further, aqueous acetic acid was added and stirred in such a way that a neutralization ratio is 35.5% to form a water-in-oil type emulsion. To this mixture, the crosslinked resin particle 3 prepared in Preparative Example 7 was added in an amount of being 10% with respect to the total solid content of this mixture. Then, the mixture was gradually diluted by adding ion-exchanged water and the emulsion was undergone phase transition to an oil-in-water type emulsion. An emulsion 4 containing fine resin particles was obtained by removing MIBK under a reduced pressure in such a way that the solid content is 30.0%. The non-volatile content of the resulting emulsion 4 containing fine resin particles was 30.2%, its pH was 6.2 and its average particle diameter was 75 nm. As described above, only single peak was exhibited in measuring a particle size distribution. The particle size distribution measured was shown in FIG. 13.

Example 5

Preparation of Oil-in-Water Type Emulsion 5 Containing Fine Resin Particles

The acrylic resin 1 having an carboxyl group, which is obtained in Preparative Example 8 and CYMEL 325 (produced by MITSUI CYTEC CORPORATION) were homogeneously mixed in a blending ratio as solid matter of 61:39, and an aqueous solution of DMEA was added and stirred in such a way that a neutralization ratio is 100% to form a water-in-oil type emulsion. To this neutralized mixture, the crosslinked resin particle 4 prepared in Preparative Example 9 was added in an amount of being 10.0% with respect to the total solid content. Then, the mixture was gradually diluted by adding ion-exchanged water and the emulsion was undergone phase transition to an oil-in-water type emulsion. An emulsion 5 containing fine resin particles was obtained by removing MIBK under a reduced pressure in such a way that the solid content is 35.0%. The non-volatile content of the resulting emulsion 5 containing fine resin particles was 35.1%, its pH was 9.6 and its average particle diameter was 75 nm. As described above, only single peak was exhibited in measuring a particle size distribution. The particle size distribution measured was shown in FIG. 14.

Example 6

Preparation of Oil-in-Water Type Emulsion 6 Containing Fine Resin Particles

In 100 parts of an aminated epoxy resin solution formed by homogeneously mixing the aminated epoxy resin 2 containing an oxazolidone ring, which is obtained in Preparative Example 2 and the blocked isocyanate curing agent 1 prepared in Preparative Examples 5 in a blending ratio as solid matter of 75:25, aqueous acetic acid in an amount such that a neutralization ratio is 40% and 50 parts of an oily dispersion of crosslinked resin particles (solid content 30 weight percent) obtained by replacing the medium (water) the crosslinked resin particles obtained in Preparative Example 7 with MIBK were previously mixed. Further, by adding 300 parts of ion-exchanged water gradually to the above-mentioned mixture, a system was undergone phase transition from a water-in-oil type to an oil-in-water type and an emulsion was formed. Further, an objective emulsion 6 containing fine resin particles was obtained by distilling off MIBK under a reduced pressure in such a way that the solid content is 36.0%. The non-volatile content of the resulting emulsion 6 containing fine resin particles was 36%, its pH was 6.5 and its average particle diameter was 80 nm. As described above, only single peak was exhibited in measuring a particle size distribution. The particle size distribution measured was shown in FIG. 15.

Comparative Example 1

Preparation of Emulsion to which Fine Crosslinked Resin Particles are Added Separately The aminated epoxy resin 1 containing an oxazolidone ring, which is obtained in Preparative Example 1 and the blocked isocyanate curing agent 1 prepared in Preparative Examples 5 were homogeneously mixed in a blending ratio as solid matter of 75:25, and then ethylene glycol monohexyl ether was added in an amount of being 8.8% with respect to the total solid content. Further, aqueous acetic acid was added and stirred in such a way that a neutralization ratio is 35.5% to form a water-in-oil type emulsion. Then, the mixture was gradually diluted by adding ion-exchanged water and the emulsion was undergone phase transition to an oil-in-water type emulsion. An emulsion not containing fine resin particles was obtained by removing MIBK under a reduced pressure in such a way that the solid content is 36.0%.

To this emulsion, the crosslinked resin particle 1 prepared in Preparative Example 3 was added in an amount of being 10% with respect to the total solid content of this mixture. The non-volatile content of the resulting emulsion was 36.1%, its pH was 6.3 and its average particle diameter was 75 nm. As described above, two peaks were exhibited in measuring a particle size distribution. The particle size distribution measured was shown in FIG. 16.

Comparative Example 2

Preparation of Emulsion to which Fine Crosslinked Resin Particles are not Added

The aminated epoxy resin 1 containing an oxazolidone ring, which is obtained in Preparative Example 1 and the blocked isocyanate curing agent 1 prepared in Preparative Examples 5 were homogeneously mixed in a blending ratio as solid matter of 75:25, and then ethylene glycol monohexyl ether was added in an amount of being 8.8% with respect to the total solid content. Further, aqueous acetic acid was added and stirred in such a way that a neutralization ratio is 35.5% to form a water-in-oil type emulsion. Then, the mixture was gradually diluted by adding ion-exchanged water and the emulsion was undergone phase transition to an oil-in-water type emulsion. An emulsion not containing fine resin particles was obtained by removing MIBK under a reduced pressure in such a way that the solid content is 36.0%. The non-volatile content of the resulting emulsion was 36.0%, its pH was 6.2 and its average particle diameter was 75 nm. As described above, only single peak was exhibited in measuring a particle size distribution. The particle size distribution measured was shown in FIG. 17.

<Evaluation of an Oil-in-Water Type Emulsion Containing Fine Resin Particles>

(Preparation of Cation Electrodeposition Coating)

707 parts of each cationic oil-in-water type emulsion containing fine resin particles obtained in Example 1, 2, 3, 4 or 6 and Comparative Example 1 or 2, 213 parts of pigment dispersion paste 1 obtained in Preparative Example 4 and 1,470 parts of ion-exchange water were mixed to prepare each cation electrodeposition coating.

[Evaluation]

(Coating Appearance)

Each cation electrodeposition coating obtained was applied to a steel panel treated with zinc phosphate at a voltage such that a film thickness after baking is 20 μm by electrodeposition and baked at 160° C. for 15 minutes to obtain a cured coating film. The surface roughness (Ra) of this coating film was measured in conditions of cut off length 0.8 mm and scanning length 4.0 mm using a surface roughness tester Surftest-211 (manufactured by Mitutoyo Corporation).

(Rust-Preventive Property of Edge Portion)

Electrodeposition and baking were conducted in the same conditions as Coating appearance described above except for using a blade of a cutter of 10 cm in length in place of a steel panel treated with zinc phosphate and number of rust-formations at the cutting edge was counted after test was conducted at 35° C. for 168 hours according to JIS Z 2371: salt spray test.

TABLE 1

| | Example | | | | | Comparative Example | |
|---|---|---|---|---|---|---|---|
| | 1 | 2 | 3 | 4 | 6 | 1 | 2 |
| Ra value | 0.25 | 0.22 | 0.22 | 0.24 | 0.23 | 0.58 | 0.25 |
| Number of formations of rust | 5 | 6 | 4 | 3 | 4 | 40 | 35 |

Table 1 shows that the coating film, obtained by using the cation electrodeposition coating containing the oil-in-water type emulsion containing fine resin particles (Examples), improved the rust-preventive property of an edge portion and did not deteriorate an appearance of coating film. On the other hand, the coating film obtained by using the cation electrodeposition coating containing the emulsion to which fine crosslinked resin particles were added separately (Comparative Example 1) was poor at the rust-preventive property of an edge portion and an appearance of coating film. And, the coating film obtained by using the cation electrodeposition coating containing the emulsion to which fine crosslinked resin particles were not added (Comparative Example 2) was poor at the rust-preventive property of an edge portion.

(Preparation of Anionic Intermediate Coating)

1,090 parts of the anionic oil-in-water type emulsion 5 containing fine resin particles obtained in Example 5 and 1,290 parts of the pigment dispersion paste 2 obtained in Preparative Example 10 were mixed and the mixture was diluted with ion-exchanged water so as to be 30 seconds in viscosity at 20° C. using Ford cup No. 4 to prepare an aqueous intermediate coating.

[Evaluation]

Lead-free electrodeposition coating ("POWERNIX 110 Gray" manufactured by NIPPON PAINT Co., Ltd.) was applied to the surface of a steel panel treated with zinc phosphate by electrodeposition in such a way that a film thickness after baking is 20 μm and heated at 160° C. for 15 minutes to form an electrodeposition coating film. Onto this, the obtained aqueous intermediate coating was applied through air spraying in such a way that a film thickness after baking is 35 μm and heated at 140° C. for 30 minutes to obtain a test panel.

Coating appearances and a rust-preventive property of edge portion were measured on the test panels following the same procedures as the above-mentioned methods. As a result, Ra was 0.05 and number of rust-formations of the edge portion was zero.

Figure 1:
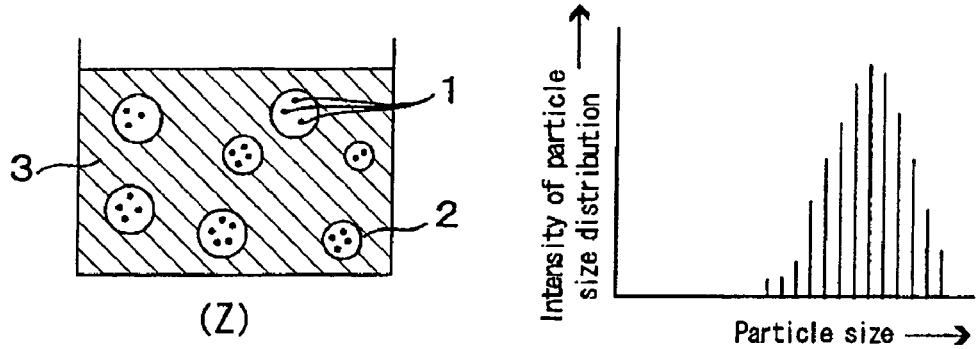
FIG. 1 is a schematic diagram showing an example of the oil-in-water type emulsion (Z) containing internally crosslinked fine resin particles obtained by the production method of the present invention.
Figure 2:
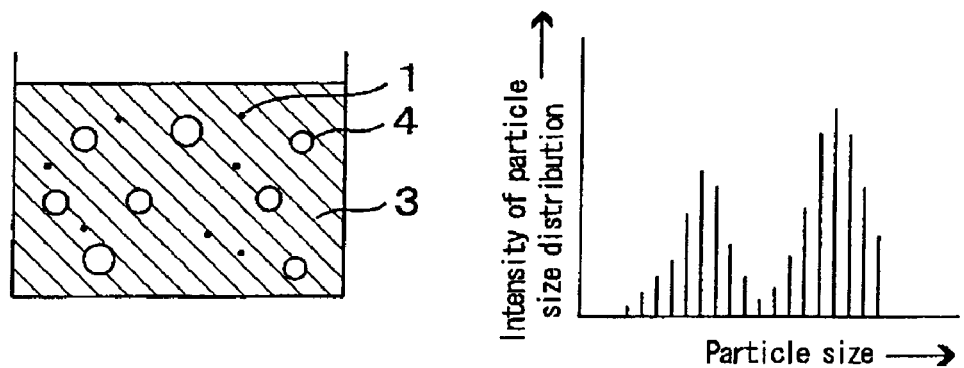
FIG. 2 is a schematic diagram showing an example of the conventional oil-in-water type emulsion containing internally crosslinked fine resin particles.
Figure 3:
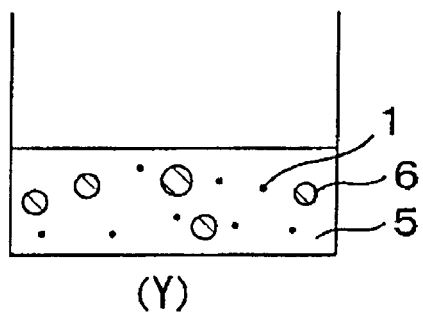
FIG. 3 is a schematic diagram showing an example of the water-in-oil type emulsion (Y) used for the production method of the present invention.
Figure 4:
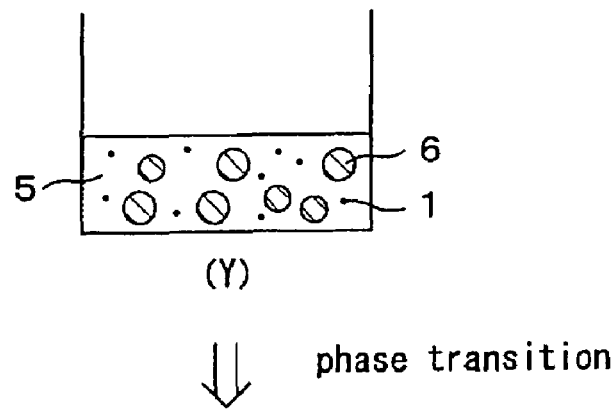
FIG. 4 is a schematic diagram showing an example of the method of producing the oil-in-water type emulsion containing internally crosslinked fine resin particles of the present invention.
Figure 5:
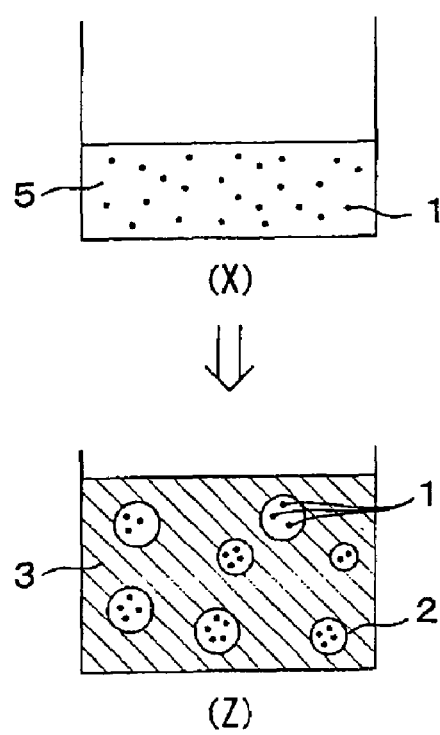
FIG. 5 is a schematic diagram showing an example of the method of producing the oil-in-water type emulsion containing internally crosslinked fine resin particles of the present invention.
Figure 6:
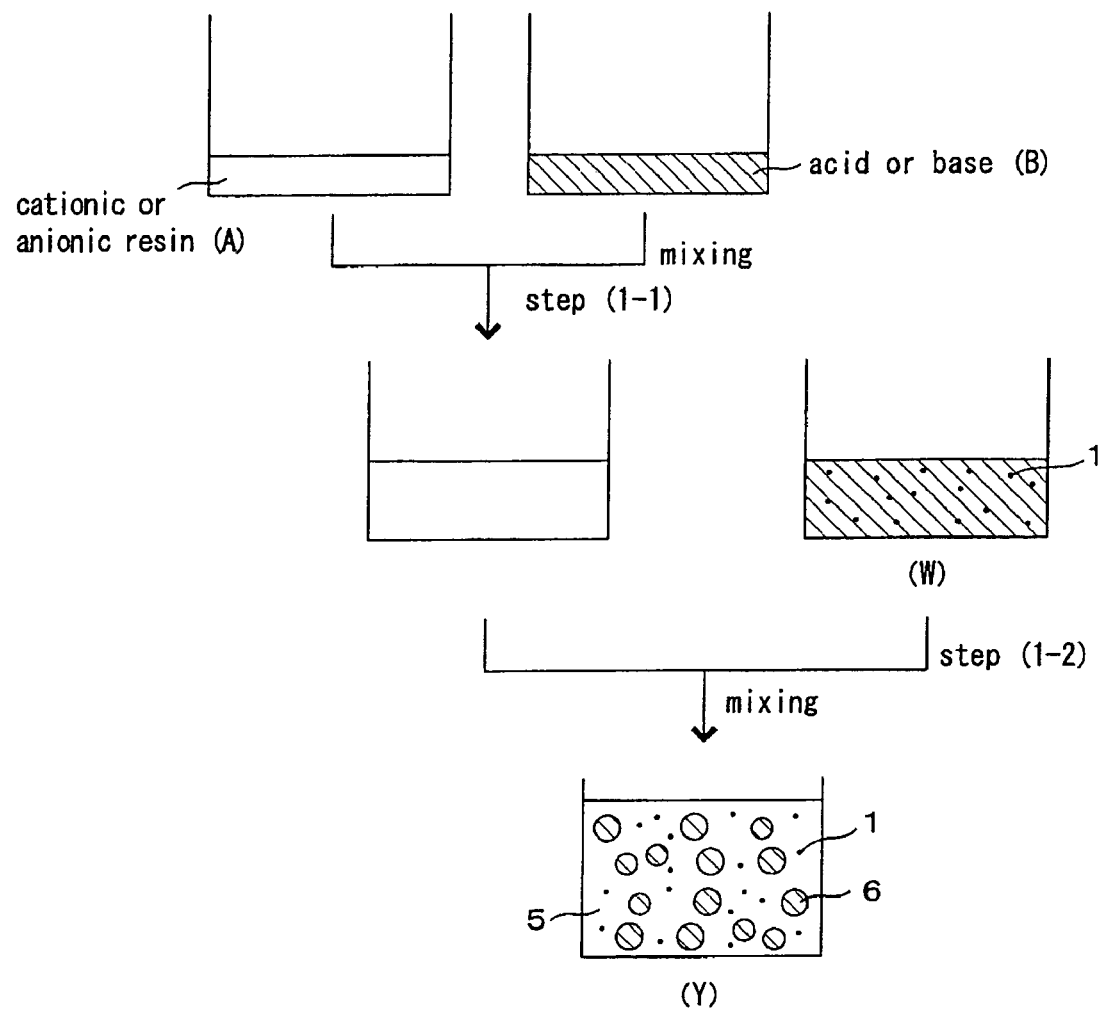
FIG. 6 is a schematic diagram showing an example of the method of producing the water-in-oil type emulsion (Y).
Figure 7:
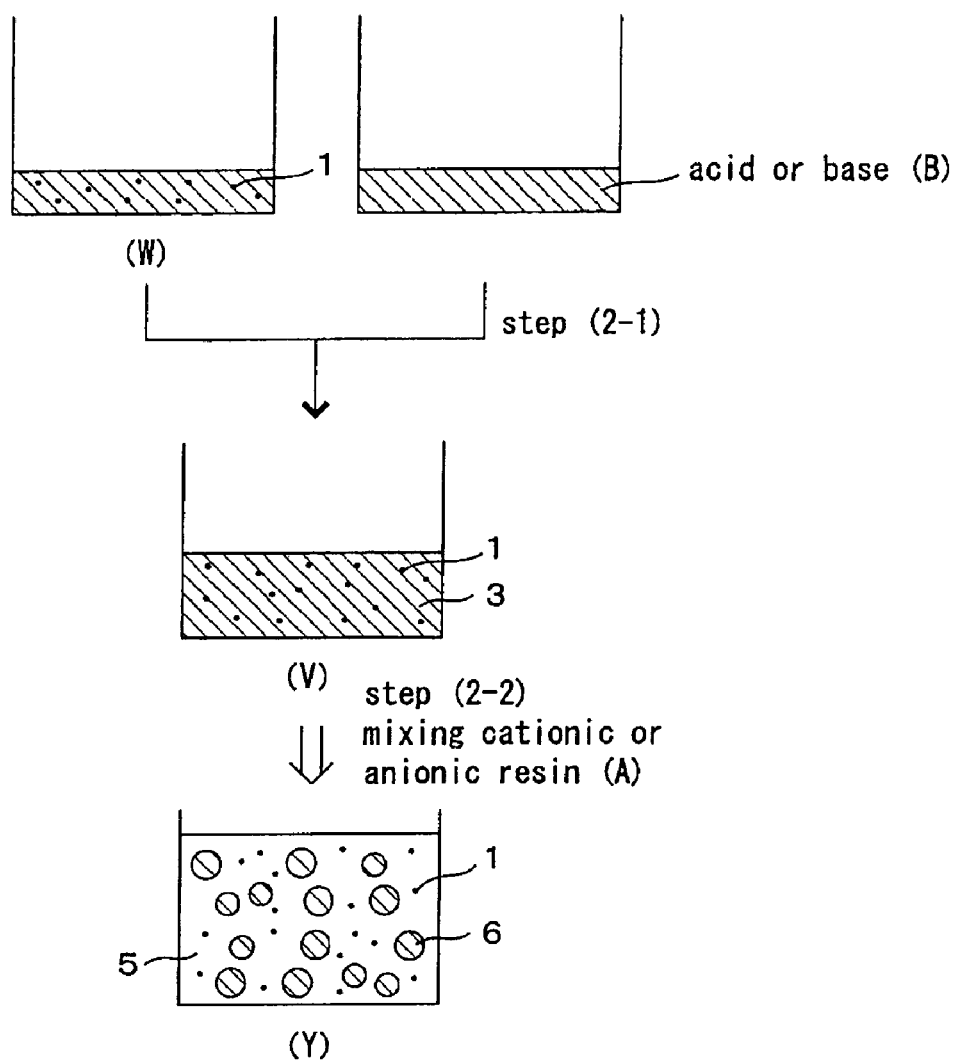
FIG. 7 is a schematic diagram showing an example of the method of producing the water-in-oil type emulsion (Y).
Figure 8:
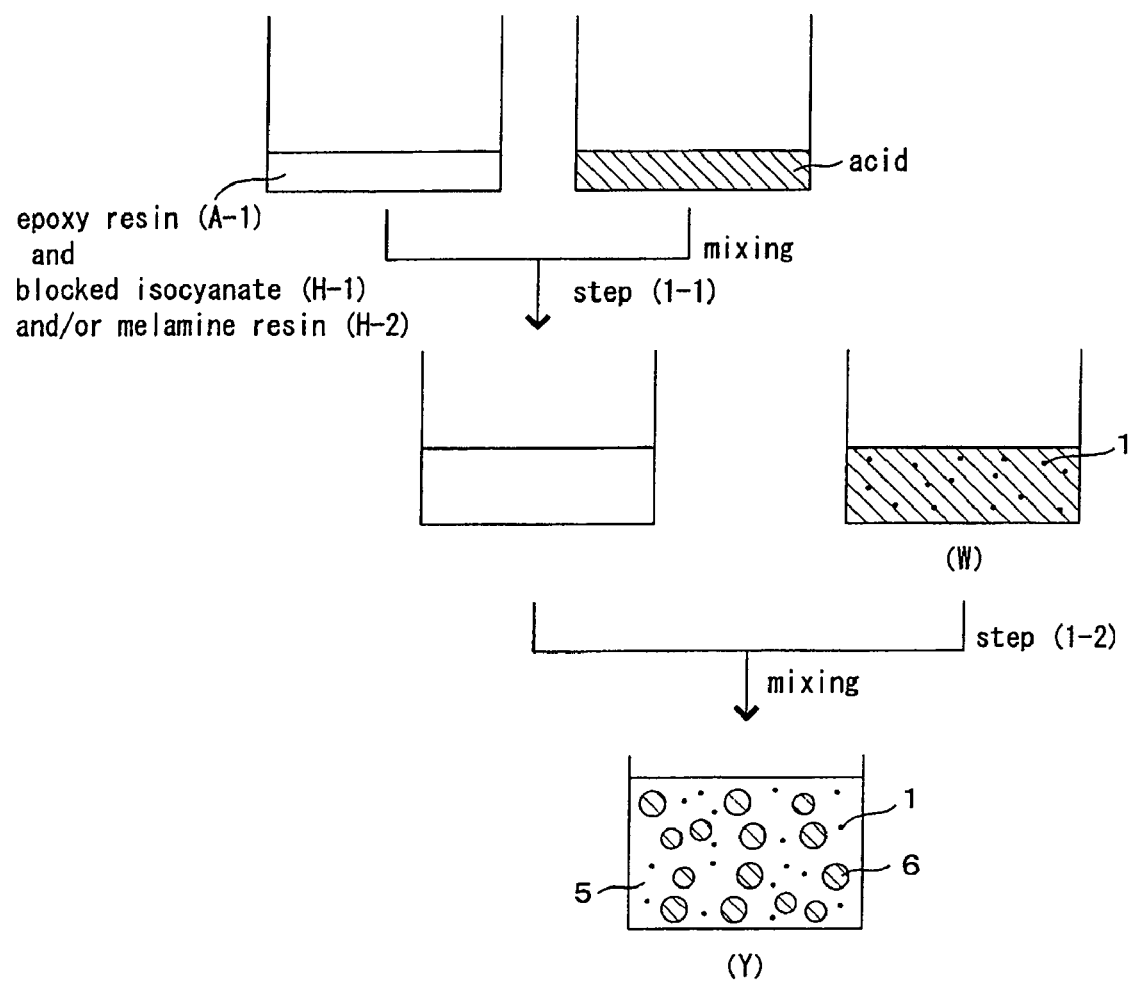
FIG. 8 is a schematic diagram showing an example of the method of producing the water-in-oil type emulsion (Y).
Figure 9:
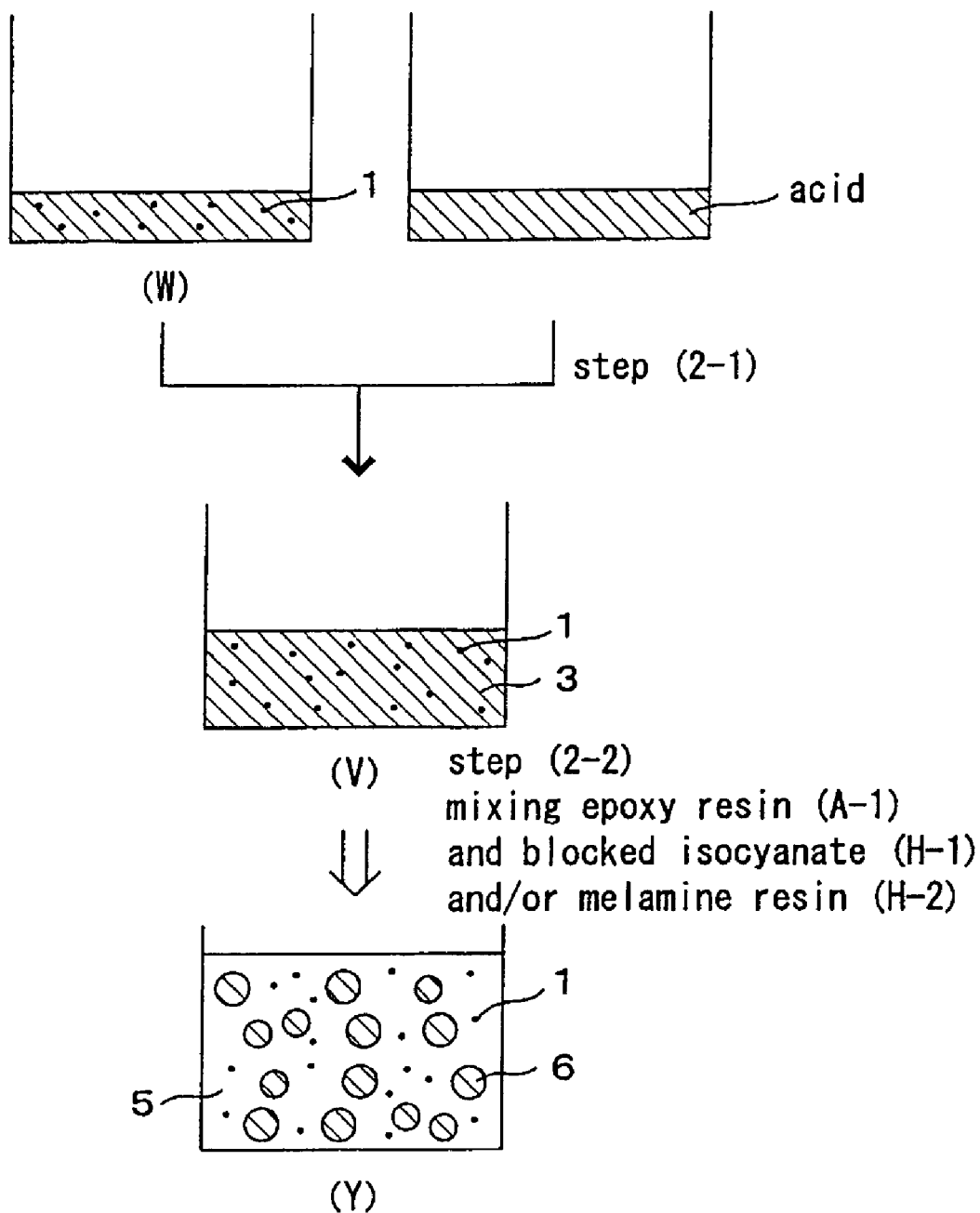
FIG. 9 is a schematic diagram showing an example of the method of producing the water-in-oil type emulsion (Y).
Figure 10:
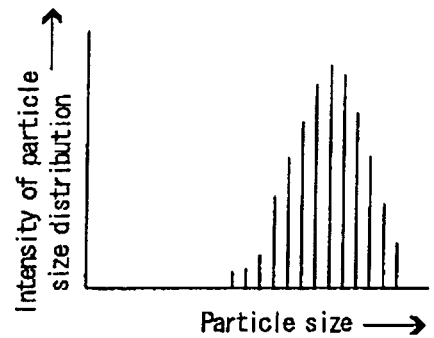
FIG. 10 is a chart showing a particle size distribution of the oil-in-water type emulsion containing the fine resin particle obtained in Example 1.
Figure 11:
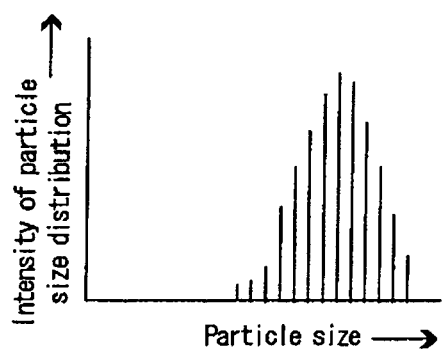
FIG. 11 is a chart showing a particle size distribution of the oil-in-water type emulsion containing the fine resin particle obtained in Example 2.
Figure 12:
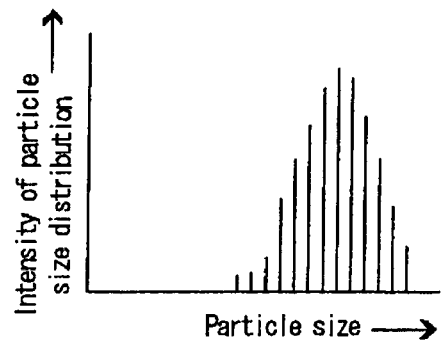
FIG. 12 is a chart showing a particle size distribution of the oil-in-water type emulsion containing the fine resin particle obtained in Example 3.
Figure 13:
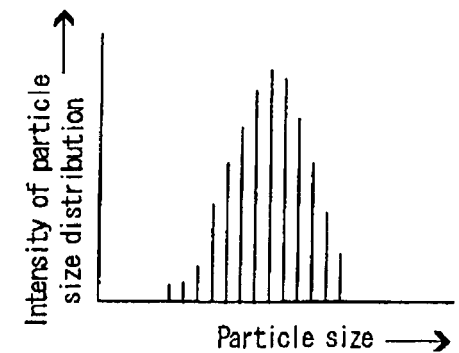
FIG. 13 is a chart showing a particle size distribution of the oil-in-water type emulsion containing the fine resin particle obtained in Example 4.
Figure 14:
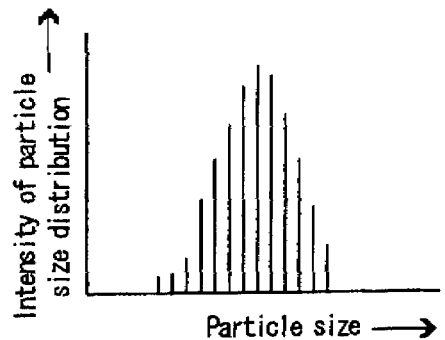
FIG. 14 is a chart showing a particle size distribution of the oil-in-water type emulsion containing the fine resin particle obtained in Example 5.
Figure 15:
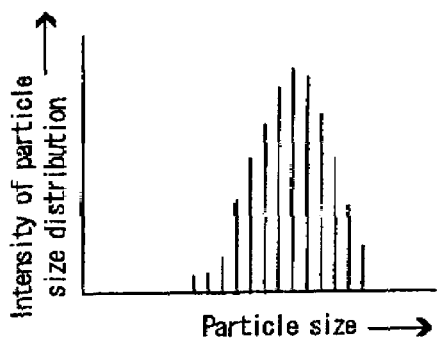
FIG. 15 is a chart showing a particle size distribution of the oil-in-water type emulsion containing the fine resin particle obtained in Example 6.
Figure 16:
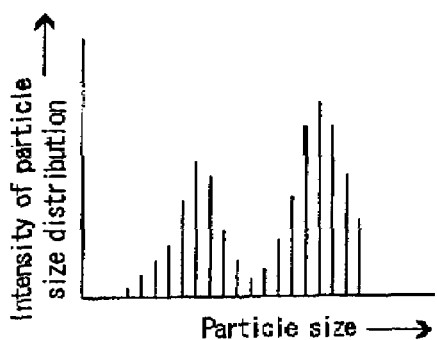
FIG. 16 is a chart showing a particle size distribution of the emulsion, to which fine crosslinked resin particles are added separately, obtained in Comparative Example 1.
Figure 17:
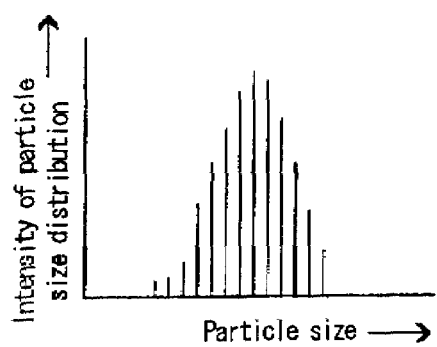
FIG. 17 is a chart showing a particle size distribution of the emulsion, to which fine crosslinked resin particles are not added, obtained in Comparative Example 2.

Explanation of Numerals 1 internally crosslinked fine resin particle (C)
2 resin emulsion particle in which internally crosslinked fine resin particle (C) is dispersed in an oil phase thereof
3 water phase
4 resin emulsion particle
5 dispersing medium conprising of resin
6 dipersoid of water-in-oil type emulsion comprising of aqueous medium

The invention claimed is:

1. A method of producing an oil-in-water emulsion containing an internally crosslinked fine resin particle, wherein the fine resin particle is encapsulated in an emulsion particle having an average particle diameter of 0.02 to 0.3 µm, comprising of a step of undergoing phase transition from a water-in-oil emulsion (Y) comprising a resin (A) having a cationic group or an anionic group, an acid or a base (B) to neutralize 20 to 150 mole percent of the cationic group or the anionic group in the resin (A), an internally crosslinked fine resin particle (C) having an average particle diameter of 0.01 to 0.2 µm and being dispersed in an oil phase, and an aqueous medium (D) to an oil-in-water emulsion (Z) by adding further aqueous medium (D) to the water-in-oil emulsion (Y).

2. The method of producing an oil-in-water emulsion containing an internally crosslinked fine resin particle according to claim 1, wherein the water-in-oil emulsion (Y) is obtained through a step (1-1) of neutralizing the resin (A) by mixing the resin (A) with the acid or base (B) to neutralize 20 to 150 mole percent of the cationic group or anionic group in the resin (A), and a step (1-2) of mixing the neutralized resin obtained through the step (1-1) with a water dispersion (W) of the internally crosslinked fine resin particle (C) having an average particle diameter of 0.01 to 0.2 µm to form the water-in-oil emulsion (Y).

3. The method of producing an oil-in-water emulsion containing an internally crosslinked fine resin particle according to claim 1, wherein the water-in-oil emulsion (Y) is obtained through a step (2-1) of mixing a water dispersion (W) of the internally crosslinked fine resin particle (C) having an average particle diameter of 0.01 to 0.2 µm with the acid or base (B) for neutralizing 20 to 150 mole percent of the cationic group or anionic group in the resin (A) to form a dispersion (V) of the internally crosslinked fine resin particle, and a step (2-2) of mixing the dispersion (V) obtained through the step (2-1) with the resin (A) to form the water-in-oil emulsion (Y).

4. A method of producing an oil-in-water emulsion containing an internally crosslinked fine resin particle, wherein the fine resin particle is encapsulated in an emulsion particle having an average particle diameter of 0.02 to 0.3 µm, comprising a step of forming an oil-in-water emulsion (Z) by adding an aqueous medium (D) to an oily medium (X) comprising a resin (A) having a cationic group or an anionic group, an acid or a base (B) to neutralize 20 to 150 mole percent of the cationic group or the anionic group in the resin (A), and an internally crosslinked fine resin particle (C) having an average particle diameter of 0.01 to 0.2 µm and being dispersed in an oil phase.

5. The method of producing an oil-in-water emulsion containing the internally crosslinked fine resin particle according to any of claims 1 to 4, wherein a hydrophobic resin (H) is further dispersed or dissolved in said emulsion particle of the oil-in-water emulsion containing the internally crosslinked fine resin particle.

6. The method of producing an oil-in-water emulsion containing an internally crosslinked fine resin particle according to claim 2, wherein the step (1-1) further comprises a step of adding a hydrophobic resin (H).

7. A cation electrodeposition coating composition comprising an oil-in-water emulsion, said oil-in-water emulsion comprising:
   an epoxy resin (A-1) having a cationic group, and/or
   a blocked isocyanate (H-1) and/or
   a melamine resin (H-2) and
   an emulsion particle containing one or more internally crosslinked fine resin particles (C), wherein
   said one or more internally crosslinked fine resin particles have a particle diameter of 0.01 to 0.2 µm, said one or more internally crosslinked fine resin particles (C) are in an oil phase, and the oil-in-water emulsion containing said one or more internally crosslinked fine resin particles has an emulsion particle diameter of 0.02 to 0.3 µm.

8. The caution electrodeposition coating composition according to claim 7, wherein 20 to 150 mole percent of the cationic group in the epoxy resin (A-1) is neutralized with acid.

9. The cation electrodeposition coating composition according to claim 7 or 8, wherein said one or more internally crosslinked fine resin particles (C) are contained in an amount of 1 to 100 weight percent of the epoxy resin (A-1).

10. The cation electrodeposition coating composition according to claim 8, wherein the blocked isocyanate (H-1) and/or the melamine resin (H-2) is contained in an amount of 10 to 50 weight percent of the epoxy resin (A-1).

11. The cation electrodeposition coating composition according to claim 7, 8, or 10, further comprising a paste in which a pigment is dispersed.

12. A coated substance obtained by electrodeposition coating of the cation electrodeposition coating composition according to any of claim 7, 8 and 10.

13. A coated substance obtained by electrodeposition coating of the cation electrodeposition coating composition according to claim 9.

14. A coated substance obtained by electrodeposition coating of the cation electrodeposition coating composition according to claim 11.

15. The cation electrodeposition coating composition according to claim 7, wherein said emulsion particle contains a plurality of said one or more internally crosslinked fine resin particles.

16. The cation electrodeposition coating composition according to claim 7, wherein said emulsion particle contains said epoxy resin (A-1) having a cationic group and/or said blocked isocyanate (H-1) and/or said melamine resin (H-2).

* * * * *